(12) United States Patent
Sokun

(10) Patent No.: US 12,192,151 B2
(45) Date of Patent: Jan. 7, 2025

(54) RELIABILITY USING SIGNAL SPACE DIVERSITY IN COOPERATIVE NON-ORTHOGONAL MULTIPLE ACCESS (NOMA)

(71) Applicant: Telefonaktiebolaget LM Ericsson (publ), Stockholm (SE)

(72) Inventor: Hamza Sokun, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 561 days.

(21) Appl. No.: 17/624,622

(22) PCT Filed: Aug. 12, 2019

(86) PCT No.: PCT/IB2019/056849
§ 371 (c)(1),
(2) Date: Jan. 4, 2022

(87) PCT Pub. No.: WO2021/028713
PCT Pub. Date: Feb. 18, 2021

(65) Prior Publication Data
US 2022/0271902 A1 Aug. 25, 2022

(51) Int. Cl.
*H04L 5/00* (2006.01)
*H04L 1/00* (2006.01)
*H04L 27/34* (2006.01)

(52) U.S. Cl.
CPC .......... *H04L 5/0083* (2013.01); *H04L 1/0071* (2013.01); *H04L 5/0005* (2013.01); *H04L 27/3444* (2013.01)

(58) Field of Classification Search
CPC ... H04L 5/0083; H04L 1/0071; H04L 5/0005; H04L 27/3444; H04L 1/0041;
(Continued)

(56) References Cited

U.S. PATENT DOCUMENTS

2017/0339709 A1* 11/2017 Zhang ............... H04J 11/004
2018/0192424 A1* 7/2018 Zhang ............... H04W 72/0473
(Continued)

OTHER PUBLICATIONS

3GPP TR 36.859 V13.0.0 (Dec. 2015); 3rd Generation Partnership Project; Technical Specification Group Radio Access Network; Study on Downlink Multiuser Superposition Transmission (MUST) for LTE (Release 13), consisting of 48 pages.
(Continued)

*Primary Examiner* — Abdullahi Ahmed
(74) *Attorney, Agent, or Firm* — Weisberg I.P. Law, P.A.

(57) ABSTRACT

A method, network node and user equipment are provided. In one or more embodiments, a first user equipment, UE, configured to communicate with a second UE for performing non-orthogonal multiple access, NOMA, communication is provided. The first UE includes processing circuitry configured to receive a first signal including a first component of interleaved-rotated symbols associated with the second UE, determine a second component of the interleaved-rotated symbols based at least in part on the received first component, and cause transmission of a second signal including the second component of the interleaved-rotated symbols to the second UE as part of the NOMA communication where the second signal not including the first component of the interleaved-rotated symbols.

24 Claims, 14 Drawing Sheets

(58) Field of Classification Search
CPC . H04L 1/0045; H04L 2001/0097; H04L 1/02; H04B 7/15592; H04B 7/022; H04B 7/0413; Y02D 30/70; H04J 11/0026
See application file for complete search history.

(56) References Cited

U.S. PATENT DOCUMENTS

| | | | |
|---|---|---|---|
| 2019/0313402 A1* | 10/2019 | Lei | H04L 5/0016 |
| 2022/0159578 A1* | 5/2022 | Sokun | H04W 52/34 |
| 2023/0224109 A1* | 7/2023 | Sokun | H04L 1/1819 370/329 |
| 2024/0154844 A1* | 5/2024 | Dogukan | H04L 27/2634 |

OTHER PUBLICATIONS

Yuan, Yifei, et al., Non-Orthogonal Transmission Technology in LTE Evolution; IEEE Communications Magazine; LTE-Advanced Pro; 2016; consisting of 7 pages.

Ding, Zhiguo et al., Application on Non-Orthogonal Multiple Access in LTE and 5G Networks; Accepted from Open Call; 2017; IEEE Communications Magazine; 2017; consisting of 7 pages.

Boccardi, Federico et al., Five Disruptive Technology Directions for 5G; 5G Wireless Communications Systems: Prospects and Challenges; IEEE Communications Magazine; Feb. 2014; consisting of 7 pages.

Ding, Zhiguo et al., Cooperative Non-Orhogonal Multiple Access in 5G Systems; IEEE Communications Letters, vol. 19, No. 8, Aug. 2015; consisting of 4 pages.

Jiao, Ruicheng et al., On the Performance of NOMA-Based Cooperative Relaying Systems over Rician Fading Channels; IEEE Transactions on Vehicular Technology; Jul. 2017; consisting of 5 pages.

Yue, Xinwei et al., Modeling and Analysis of Two-Way Relay Non-Orthogonal Multiple Access Systems; IEEE Transactions on Communications vol. 66, No. 9; Sep. 2018, consisting of 13 pages.

Fodor, Gabor et al., An Overview of Device-to-Device Communications Technology Components in METIS; IEEE Access 4; 2016; consisting of 11 pages.

Tehrani, Mohsen Nader et al., Device-to-Device Communication in 5G Cellular Networks: Challenges, Solutions, and Future Directions; 5G Wireless Communications Systems: Prospects and Challenges; IEEE Communications Magazine; May 2014; consisting of 7 pages.

Boutros, Joseph et al., Signal Space Diversity: A Power-and Bandwidth-Efficient Diversity Technique for the Rayleigh Fading Channel; IEEE Transactions on Information Theory vol. 44, No. 4; Jul. 1998; consisting of 15 pages.

Ahmadzadeh, Sayed Ali et al., Signal Space Cooperative Communication; IEEE Transactions on Wireless Communications, vol. 9 No, 4; Apr. 2010; consisting of 6 pages.

Sokun, Hamza Umit et al., A Spectrally Efficient Signal Space Diversity-Based Two-Way Relaying System; IEEE Transactions on Vehicular Technology, vol. 66, No. 7; Jul. 2017; consisting of 16 pages.

Lu, Tao et al., BEP Analysis for DF Cooperative Systems Combined with Signal Space Diversity; IEEE Communications Letters, vol. 16, No. 4; Apr. 2012; consisting of 4 pages.

International Search Report and Written Opinion dated May 18, 2020 issued in PCT Application PCT/IB2019/056849, consisting of 15 pages.

Pan, Lu et al., Spatial Modulation Aided Cooperative NOMA: Implementation and Achievable Rate Analysis; IEEE International Conference on Communications (ICC), IEEE; May 2019; consisting of 5 pages.

ZTE; Updated Offline Summary of Transmitter Side Signal Processing Schemes for NOMA; 3GPP Draft; R1-1809974; Gothenburg, Sweden; Aug. 20-24, 2018; Agenda Item: 7.2.1.1; Document for: Discussion and Decision; consisting of 23 pages.

* cited by examiner

RELIABILITY USING SIGNAL SPACE DIVERSITY IN COOPERATIVE NON-ORTHOGONAL MULTIPLE ACCESS (NOMA)

CROSS-REFERENCE TO RELATED APPLICATION

This application is a Submission Under 35 U.S.C. § 371 for U.S. National Stage Patent Application of International Application Number: PCT/IB2019/056849, filed Aug. 12, 2019 entitled "RELIABILITY USING SIGNAL SPACE DIVERSITY IN COOPERATIVE NON-ORTHOGONAL MULTIPLE ACCESS (NOMA)," the entirety of which is incorporated herein by reference.

TECHNICAL FIELD

Wireless communication and in particular, to signal space diversity in cooperative Non-Orthogonal Multiple Access (NOMA).

BACKGROUND

Several techniques for improving wireless communications are discussed below.
a. Non-Orthogonal Multiple Access (NOMA):
One technique for next generation wireless networks is non-orthogonal multiple access (NOMA) that may generally relate to using a power domain for multiple access which is different from using time, frequency and/or code domain(s) for multiple access. The Third Generation Partnership Project (3GPP) initiated a study item on downlink power-domain multiplexing NOMA in LTE Release-13, specifically in 3GPP Technical Reference (TR) 36.859, in order to further study NOMA. In particular, the NOMA scheme/technique serves several user equipments (UEs) on the same resource block (RB) by multiplexing the UEs in the power domain such as, for example, by allocating lower power to the UEs with stronger channel conditions, and higher power to the UEs with weaker channel conditions. In this way, NOMA may achieve not only higher overall throughput than the typical orthogonal multiple access (OMA) systems, e.g., OFDMA, but also, improved fairness in the network. The last feature may be of importance for Internet-of-Things (IoT), since IoT nodes may require high transmission reliability, and low throughput.

One scenario is considered where a base station (BS) with single antenna transmits a superposition of two symbols to two UEs, each of them with single antenna, over the same resource block (RB). Also, the UEs may have been selected based on a UE-clustering algorithm, and the power allocation in this 2-UE downlink NOMA cluster is pre-calculated based on a power allocation algorithm.

According to the multiuser superposition transmission scheme, the transmitted signal is formed as $\hat{x}=x_1+x_2$, and $x_i = \sqrt{a_i P_t} s_i^j$, where $s_i^j$ is the j-th symbol for UEs (U)i with $E[|s_i^j|^2]=1$, and $a_i P_t$ is the transmit power associated with $s_i^j$, where $a_i$ is the power allocation coefficient ($\Sigma_{i=1}^2 a_i = 1$), and $P_t$ is the total transmit power in the system. The channel gains of the UEs, $U_1$, and $U_2$ are respectively $H_1=|h_1|^2$, $H_2=|h_2|^2$, where $h_i$ is the complex channel coefficient between $U_i$ and network node, and $H_1 > H_2$. It may be assumed that the transmit power of the UEs is allocated in inverse proportional to their channel gains, and successive interference cancellation (SIC) is employed at the receiver of UEs to reduce the interference from the other UEs on the same RB. Then, $U_1$ first performs SIC to cancel interference from $U_2$. However, $U_2$ cannot cancel any interference from $U_1$. The achievable throughput for $U_i$ in a 2-UE NOMA system, $R_i$, can be expressed as $$R_i = W\log_2\left(1 + \frac{a_i P_t H_i}{\sum_{j=1}^{i-1} a_j P_t H_i + WN_0}\right),$$

where W is the bandwidth of each RB, and $N_0$ is the power spectral density of the additive white Gaussian noise (AWGN).
b. Cooperative Communication:
To improve transmission reliability in wireless networks, cooperative communication has been proposed in Orthogonal Multiple Access (OMA) systems.

This technique can provide the benefits of multiple antennas to single-antenna nodes. OMA achieves spatial diversity by forming a virtual antenna array between spatially distributed nodes. Particularly, in this technique, source and relay nodes cooperate to transmit their data to a destination node where the relay nodes are used to forward data symbols from source node to destination node. Hence, destination node receives two copies of the same data symbol from two different cooperative nodes in two different time-slots. Moreover, to further help improve the error-rate performance of multi-relay cooperative systems, the reactive/proactive best-relay selection techniques has been considered.
c. Cooperative NOMA (Cooperative Communication+ NOMA):

In conventional NOMA systems, the UEs with stronger channel conditions uses successive interference cancellation (SIC) receivers to decode their own signals. This is, UEs know the signals of the other UEs with weaker channel conditions, since the UEs using SIC receivers first decode the signals of the other UEs with weaker channel conditions for interference cancellation before decoding their own signal. However, a UE having such knowledge/information available to it is not exploited in conventional NOMA systems. To leverage this prior information (i.e., knowledge of other UEs with weaker channel conditions), cooperative NOMA technique has been proposed. Cooperative NOMA is a combination of cooperative relaying and NOMA. In this technique, the UEs with stronger channel conditions relay the decoded message of the UEs with weaker channel conditions to enhance the reception reliability of these UEs using cooperative diversity (i.e., spatial diversity).

An example of 2 UE Cooperative NOMA is illustrated in FIG. 1. In particular, FIG. 1 illustrates system 2 that includes network node 4, UE-1 and UE-2. The cooperative NOMA transmission scheme can be divided into two phases: direct transmission phase and cooperative transmission phase. During the direct transmission phase, the network node broadcasts a combination of messages or superposition of the signals for both UE 2 (associated with the weaker channel condition) and UE 1 (associated with the stronger channel condition). In one example of FIG. 1, network node 4 transmits $\sqrt{a_{UE-1}P_t}s_{UE-1}^1 + \sqrt{a_{UE-2}P_t}s_{UE-2}^1$ to both UE-1 and UE-2. During the cooperative transmission phase, after carrying out SIC, i.e., SIC processing, at UE-1 for decoding UE-2's message, UE-1 performs functions of a relay and forwards the decoded message to UE-2. In the example of FIG. 2, UE-1 transmits $\sqrt{P_t}s_{UE-2}^1$ to UE-2. In two time slots, two copies of the same message are received at UE-2 through two different channels, and hence, the reception reliability is enhanced for UE 2 via spatial diversity.

The direct communication between these two UEs that does not travel through the network node may be considered device-to-device (D2D) communication in cellular networks. The fundamental functionalities for D2D communications known such as those functionalities specified in 3GPP in Release-12 for public safety communications, and also, other 3GPP study items know in the art.

d. Signal Space Diversity:

Another technique to improve transmission reliability in wireless networks is signal space diversity (SSD). This technique leverages the diversity available in the modulation signal space, viz., modulation diversity. More particularly, in this technique, original data symbols are first rotated by a certain angle before transmission to ensure that both in-phase and quadrature-phase components of the rotated data symbols carry enough information to uniquely represent the original data symbols. Later, in-phase and quadrature-phase interleaving is employed to the rotated symbols to ensure that in-phase and quadrature-phase components of the same data symbol are sent over independent realizations of the channel.

For example, referring to FIG. 2, network node 4 generates $\sqrt{P}\lambda_{UE}^2$ and $\sqrt{P}\lambda_{UE}^1$ as by transitioning the original constellation to an expanded constellation:
1. $s_{UE}^1, s_{UE}^2 \in S$ (Original constellation)
2. $x_{UE}^1, x_{UE}^2 \in \chi$ (Rotated constellation)
3. $\lambda_{UE}^1 = \text{Re}\{x_{UE}^1\} + j\text{Im}\{x_{UE}^2\}$, and $\lambda_{UE}^2 = \text{Re}\{x_{UE}^6\} + j\text{Im}\{x_{UE}^1\}$
4. $\lambda_{UE}^1, \lambda_{UE}^2 \in \Lambda$ (Expanded constellation), where $\Lambda \in \text{Re}\{\chi\} \times \text{Im}\{\chi\}$.

Network node 4 then transmits $\sqrt{P}\lambda_{UE}^1$ during a first time slot and $\sqrt{P}\lambda_{UE}^2$ during a second time slot occurring immediately after the first time slot.

e. Signal Space Cooperation (Signal Space Diversity+Cooperative Communication) OMA:

As discussed above, SSD and cooperative communication may help improve transmission reliability by exploiting modulation diversity and spatial diversity, respectively. To leverage both diversities at the same time, the SSD-based cooperative technique has been proposed for OMA systems by considering different cooperative transmission protocols, such as two-time-slots, three-time-slots, and four-time-slots transmission protocols. In this technique, in-phase and quadrature-phase of the same data symbol are transmitted from different cooperative nodes in different time-slots.

However, there exists a need to further improve characteristics of communication such as transmission reliability for nodes such as IoT nodes.

SUMMARY

Some embodiments advantageously provide a method and system for SSD-based cooperative NOMA with optional best relaying node selection.

In 5G, the functionality of Internet of Things (IoT) to connect trillions of devices is planned to be accommodated for by emerging technologies. Even though many of IoT nodes have relatively low data rate requirements, these requirements extra care should be taken to realize these requirements, particularly for cell-edge nodes. Hence, enhancing transmission reliability at those IoT nodes are critical. NOMA has already helped to improve the transmission reliability by allocating higher transmission power to the UEs with weaker channel conditions, but there is still room for improvement by using spatial diversity, modulation diversity, and best-relaying-node selection jointly, as described herein.

In particular, while 1) SSD; 2) Cooperative relaying and 3) The best-relaying-node selection, effectively improve transmission reliability in wireless communication these techniques have not been combined in the manner described herein. Hence, a transmission scheme for NOMA systems, SSD-based cooperative NOMA, which combines these three techniques, is provided herein.

Advantages of the transmission scheme described herein include one or more of: 1) Joint consideration of modulation diversity, spatial diversity, best-relaying-node selection, and power domain multiplexing of UEs on the same RB, and 2) Improvement of the transmission reliability at the UEs with weaker channel conditions.

According to one aspect of the disclosure, a first user equipment, UE, configured to communicate with a second UE for performing non-orthogonal multiple access, NOMA, communication is provided. The first UE includes processing circuitry configured to: receive a first signal including a first component of interleaved-rotated symbols associated with the second UE, determine a second component of the interleaved-rotated symbols based at least in part on the received first component, and cause transmission of a second signal including the second component of the interleaved-rotated symbols to the second UE as part of the NOMA communication where the second signal does not include the first component of the interleaved-rotated symbols.

According to one or more embodiments of this aspect, determining the second component of the interleaved-rotated symbols includes: decoding the first component of the interleaved-rotated symbols into deinterleaved-rotated first and second symbols, and interleaving the deinterleaved-rotated components of the rotated symbols to generate the second component of the interleaved-rotated symbols that was not included in the first signal. According to one or more embodiments of this aspect, determining the second component of the interleaved-rotated symbols includes: decoding the first component of the interleaved-rotated symbols to generate deinterleaved and unrotated first and second original symbols, rotating the first and second original symbols to generate rotated first and second symbols, and interleaving the rotated components of the rotated symbols to generate the second component of the interleaved-rotated symbols that was not included in the first signal.

According to one or more embodiments of this aspect, the first signal is a superimposed signal including the first component of interleaved-rotated symbols associated with the second UE and another component of interleaved-rotated symbols associated with the first UE where the second signal does not include components of interleaved-rotated symbols associated with the first UE. According to one or more embodiments of this aspect, the first signal is received in a first time slot and the second signal is transmitted in a second time slot, the second time slot occurring after the first time slot. According to one or more embodiments of this aspect, the processing circuitry is further configured to: receive, in a third time slot, a third signal including the second component of interleaved-rotated symbols associated with the second UE, determine the first component of the interleaved-rotated symbols based at least in part on the received first component of the interleaved-rotated symbols, and cause transmission, in a fourth time slot occurring after the third time slot, of a fourth signal including the first component of the interleaved-rotated symbols to the second UE as part of the NOMA communication where the fourth signal does not include the second component of the interleaved-rotated symbols.

According to one or more embodiments of this aspect, the first component of interleaved-rotated symbols corresponds to interleaved in-phase and quadrature components of rotated symbols. According to one or more embodiments of this aspect, the first UE is a relay UE communicating with the second UE over a wireless communication channel having a higher signal to noise ratio, SNR, than other wireless communication channels between the second UE and other UEs. According to one or more embodiments of this aspect, the first and second components of the interleaved-rotated symbols are part of an expanded constellation of symbols that is expanded from a rotated constellation of rotated symbols. According to one or more embodiments of this aspect, the rotated constellation of symbols corresponds to a rotation of an original constellation of original symbols by a predefined quantity. According to one or more embodiments of this aspect, the predefined quantity of rotation is based at least in part on a signal-to-interference-plus-noise ratio, SINR.

According to another aspect of the disclosure, a first UE configured to communicate with a second UE and a network node for performing non-orthogonal multiple access, NOMA, communication is provided. The first UE includes processing circuitry configured to: receive a first signal as part of the NOMA communication, the first signal including a first component of interleaved-rotated symbols associated with the first UE; receive a second signal as part of the NOMA communication, the second signal including a second component of interleaved-rotated symbols associated with the first UE where the second signal not including the first component of interleaved-rotated symbols, and determine original symbols based at least in part on the first and second signals.

According to one or more embodiments of this aspect, the first signal is a superimposed signal including the first component of interleaved-rotated symbols associated with the first UE and another component of interleaved-rotated symbols associated with the second UE. According to one or more embodiments of this aspect, the first signal is received in a first time slot and the second signal is transmitted in a second time slot that occurs after the first time slot. According to one or more embodiments of this aspect, the processing circuitry is further configured to: receive a third signal during a third time slot as part of the NOMA communication, the third signal including the second component of interleaved-rotated symbols associated with the first UE, receive a fourth signal during a fourth time slot as part of the NOMA communication, the fourth signal including the first component of interleaved-rotated symbols associated with the first UE where the fourth signal does not include the second component of interleaved-rotated symbols, and where the determining of the original symbols is further based at least in part on the third and fourth signals.

According to one or more embodiments of this aspect, the first component of interleaved-rotated symbols corresponds to interleaved in-phase and quadrature components of rotated symbols. According to one or more embodiments of this aspect, the second UE is a relay node communicating with the first UE over a channel having a higher SNR than other channels between the first UE and other UEs. According to one or more embodiments of this aspect, the first and second components of the interleaved-rotated symbols are part of an expanded constellation of symbols that is expanded from a rotated constellation of rotated symbols.

According to one or more embodiments of this aspect, the rotated constellation of symbols corresponds to a rotation of an original constellation of original symbols by a predefined quantity. According to one or more embodiments of this aspect, the predefined quantity of rotation is based at least in part on a signal-to-interference-plus-noise ratio, SINR. According to one or more embodiments of this aspect, the processing circuitry is further configured to: receive at least one other signal including the second component of interleaved-rotated symbols associated with the first UE from at least one other UE, and determine the second signal including the second component of interleaved-rotated symbols associated with the first UE has a higher SNR than the at least one other signal. The determining of the original symbols is not based at least in part on the at least one other signal including the second component. According to one or more embodiments of this aspect, the first signal is received from the network node and the second signal is received from the second UE acting as a relay UE.

According to another aspect of the disclosure, a method implemented by a first UE configured to communicate with a second UE for performing non-orthogonal multiple access, NOMA, communication is provided. A first signal including a first component of interleaved-rotated symbols associated with the second UE is received. A second component of the interleaved-rotated symbols is determined based at least in part on the received first component. Transmission of a second signal including the second component of the interleaved-rotated symbols to the second UE as part of the NOMA communication is caused. The second signal not including the first component of the interleaved-rotated symbols. According to one or more embodiments of this aspect, the determining of the second component of the interleaved-rotated symbols includes: decoding the first component of the interleaved-rotated symbols into deinterleaved-rotated first and second symbols, and interleaving the deinterleaved-rotated components of the rotated symbols to generate the second component of the interleaved-rotated symbols that was not included in the first signal. According to one or more embodiments of this aspect, determining of the second component of the interleaved-rotated symbols includes: decoding the first component of the interleaved-rotated symbols to generate deinterleaved and unrotated first and second original symbols; rotating the first and second original symbols to generate rotated first and second symbols, and interleaving the rotated components of the rotated symbols to generate the second component of the interleaved-rotated symbols that was not included in the first signal.

According to one or more embodiments of this aspect, the first signal is a superimposed signal including the first component of interleaved-rotated symbols associated with the second UE and another component of interleaved-rotated symbols associated with the first UE, and where the second signal not including components of interleaved-rotated symbols associated with the first UE. According to one or more embodiments of this aspect, the first signal is received in a first time slot and the second signal is transmitted in a second time slot, the second time slot occurring after the first time slot. According to one or more embodiments of this aspect, in a third time slot, a third signal including the second component of interleaved-rotated symbols associated with the second UE is received. The first component of the interleaved-rotated symbols is determined based at least in part on the received first component of the interleaved-rotated symbols. Transmission is caused, in a fourth time slot occurring after the third time slot, of a fourth signal including the first component of the interleaved-rotated symbols to the second UE as part of the NOMA communication where the fourth signal does not include the second component of the interleaved-rotated symbols. According to one or more embodiments of this aspect, the first component of interleaved-rotated symbols corresponds to interleaved in-phase and quadrature components of rotated symbols. According to one or more embodiments of this aspect, the first UE is a relay UE communicating with the second UE over a wireless communication channel having a higher signal to noise ratio, SNR, than other wireless communication channels between the second UE and other UEs.

According to one or more embodiments of this aspect, the first and second components of the interleaved-rotated symbols are part of an expanded constellation of symbols that is expanded from a rotated constellation of rotated symbols. According to one or more embodiments of this aspect, the rotated constellation of symbols corresponds to a rotation of an original constellation of original symbols by a predefined quantity. According to one or more embodiments of this aspect, the predefined quantity of rotation is based at least in part on a signal-to-interference-plus-noise ratio, SINR.

According to another aspect of the disclosure, a method implemented by a first user equipment, UE, configured to communicate with a second UE and a network node for performing non-orthogonal multiple access, NOMA, communication. A first signal is received as part of the NOMA communication where the first signal includes a first component of interleaved-rotated symbols associated with the first UE. A second signal is received as part of the NOMA communication where the second signal includes a second component of interleaved-rotated symbols associated with the first UE where the second signal does not include the first component of interleaved-rotated symbols. Original symbols are determined based at least in part on the first and second signals.

According to one or more embodiments of this aspect, the first signal is a superimposed signal including the first component of interleaved-rotated symbols associated with the first UE and another component of interleaved-rotated symbols associated with the second UE. According to one or more embodiments of this aspect, the first signal is received in a first time slot and the second signal is transmitted in a second time slot that occurs after the first time slot. According to one or more embodiments of this aspect, a third signal is received during a third time slot as part of the NOMA communication where the third signal includes the second component of interleaved-rotated symbols associated with the first UE. A fourth signal is received during a fourth time slot as part of the NOMA communication where the fourth signal includes the first component of interleaved-rotated symbols associated with the first UE and where the fourth signal does not include the second component of interleaved-rotated symbols. The determining of the original symbols is further based at least in part on the third and fourth signals.

According to one or more embodiments of this aspect, the first component of interleaved-rotated symbols corresponds to interleaved in-phase and quadrature components of rotated symbols. According to one or more embodiments of this aspect, the second UE is a relay UE communicating with the first UE over a channel having a higher signal to noise ratio, SNR, than other channels between the first UE and other UEs. According to one or more embodiments of this aspect, the first and second components of the interleaved-rotated symbols are part of an expanded constellation of symbols that is expanded from a rotated constellation of rotated symbols.

According to one or more embodiments of this aspect, the rotated constellation of symbols corresponds to a rotation of an original constellation of original symbols by a predefined quantity. According to one or more embodiments of this aspect, the predefined quantity of rotation is based at least in part on a signal-to-interference-plus-noise ratio, SINR. According to one or more embodiments of this aspect, at least one other signal including the second component of interleaved-rotated symbols associated with the first UE is received from at least one other UE. The second signal including the second component of interleaved-rotated symbols associated with the first UE is determined to have a higher signal to noise ratio, SNR, than the at least one other signal. The determining of the original symbols is not based at least in part on the at least one other signal including the second component. According to one or more embodiments of this aspect, the first signal is received from the network node and the second signal is received from the second UE acting as a relay UE.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
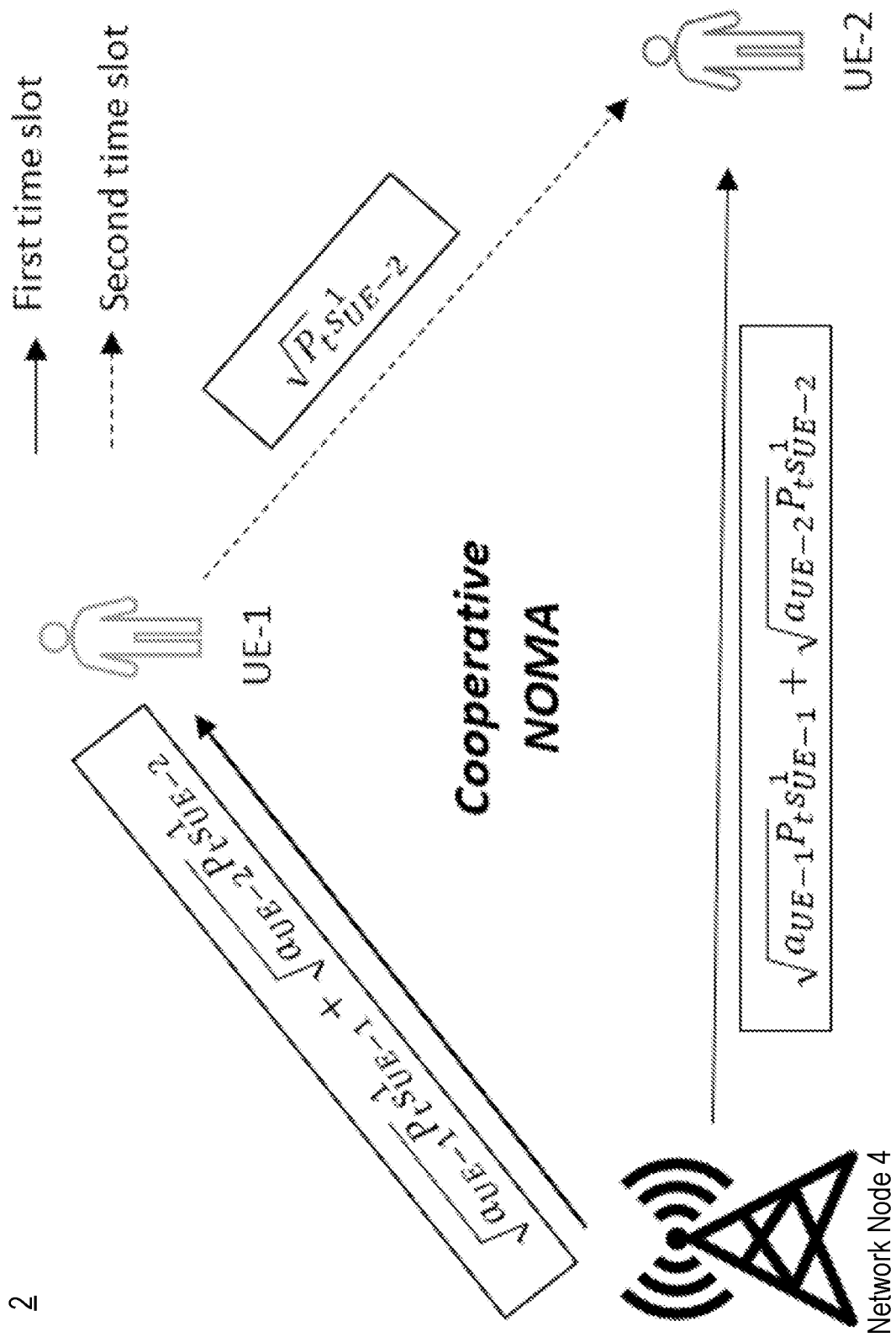
FIG. 1 is a diagram for two UE cooperative NOMA.
Figure 2:
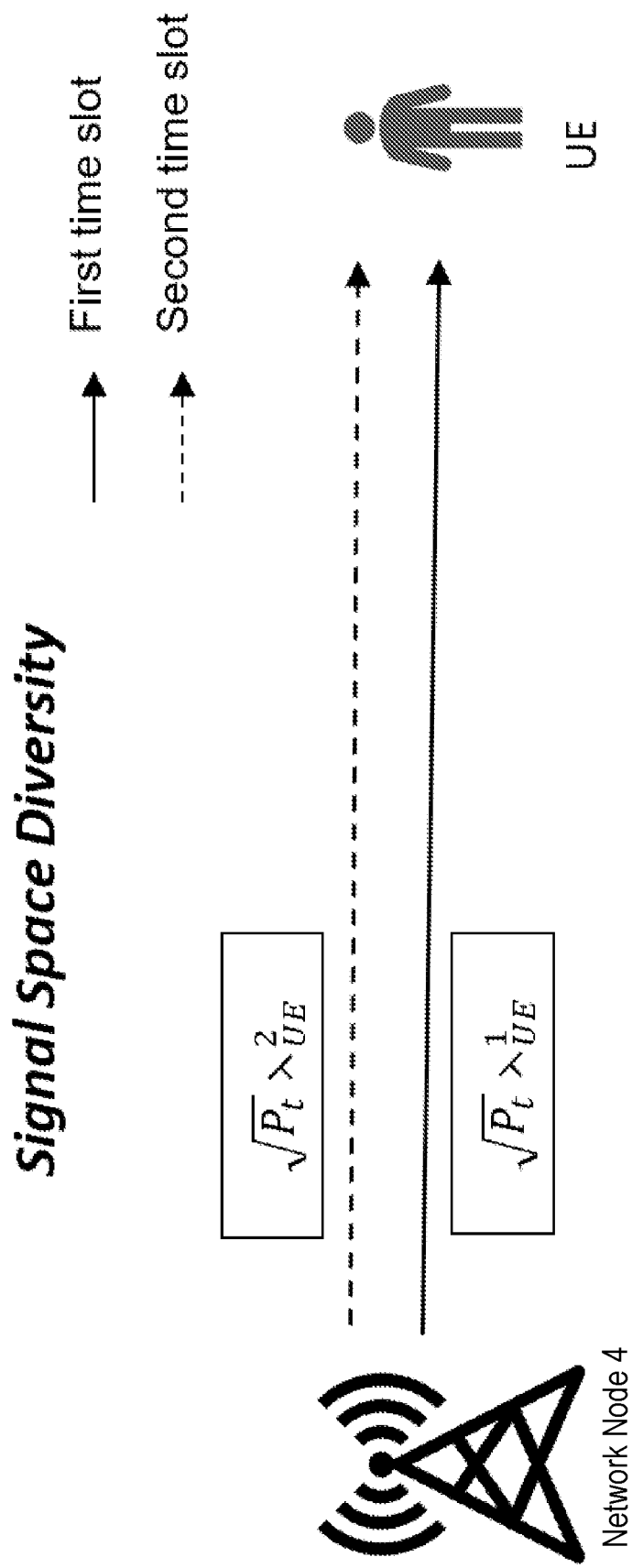
FIG. 2 is a diagram for signal space diversity based transmission in OMA systems.

Before describing in detail exemplary embodiments, it is noted that the embodiments reside primarily in combinations of apparatus components and processing steps related to SSB-based cooperative NOMA that may optionally include best relaying node selection. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a user equipment or a radio network node.

In some embodiments, the non-limiting terms wireless device (WD) or a user equipment (UE) are used interchangeably. The UE herein can be any type of wireless device capable of communicating with a network node or another UE over radio signals, such as UE. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a UE or wireless device or node may involve instructing and/or causing the wireless device or node to change its configuration, e.g., at least one setting and/or register entry and/or operational mode. A UE or wireless device or node may be adapted to configure itself, e.g., according to information or data in a memory of the UE or wireless device. Configuring a node or UE or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a UE may include sending allocation/configuration data to the UE indicating which modulation and/or encoding to use. A UE may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

D2D communication (sidelink communication) may comprise transmission and/or reception of data. It may be considered that D2D communication may generally comprise and/or be defined by data being transmitted from one UE, e.g. the transmitter or transmitter UE, (in particular directly) to another UE, e.g. the receiver or receiver UE, in particular without the data transmitted being transmitted and/or relayed via a cellular network and/or base station or radio node of such. D2D communication may comprise relaying and/or hopping via a plurality of UEs. It may be considered that D2D communication is supported by a network, e.g. by the network and/or base station or radio node providing resource allocation, e.g. allocating resource pools for D2D communication. D2D communication may for example comprise D2D discovery transmission and/or D2D data transmission (the data may in particular be user data and/or payload data). Generally, D2D transmissions may be provided on resources used for UL and/or DL transmissions in cellular communication. However, in some variants, the resources may be UL resources (in the cellular context), e.g. as determined by a standard like LTE.

Note further, that functions described herein as being performed by a UE or a network node may be distributed over a plurality of UEs and/or network nodes. In other words, it is contemplated that the functions of the network node and UE described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide SSB-based cooperative NOMA that may optionally include best relaying node selection.

Figure 3:
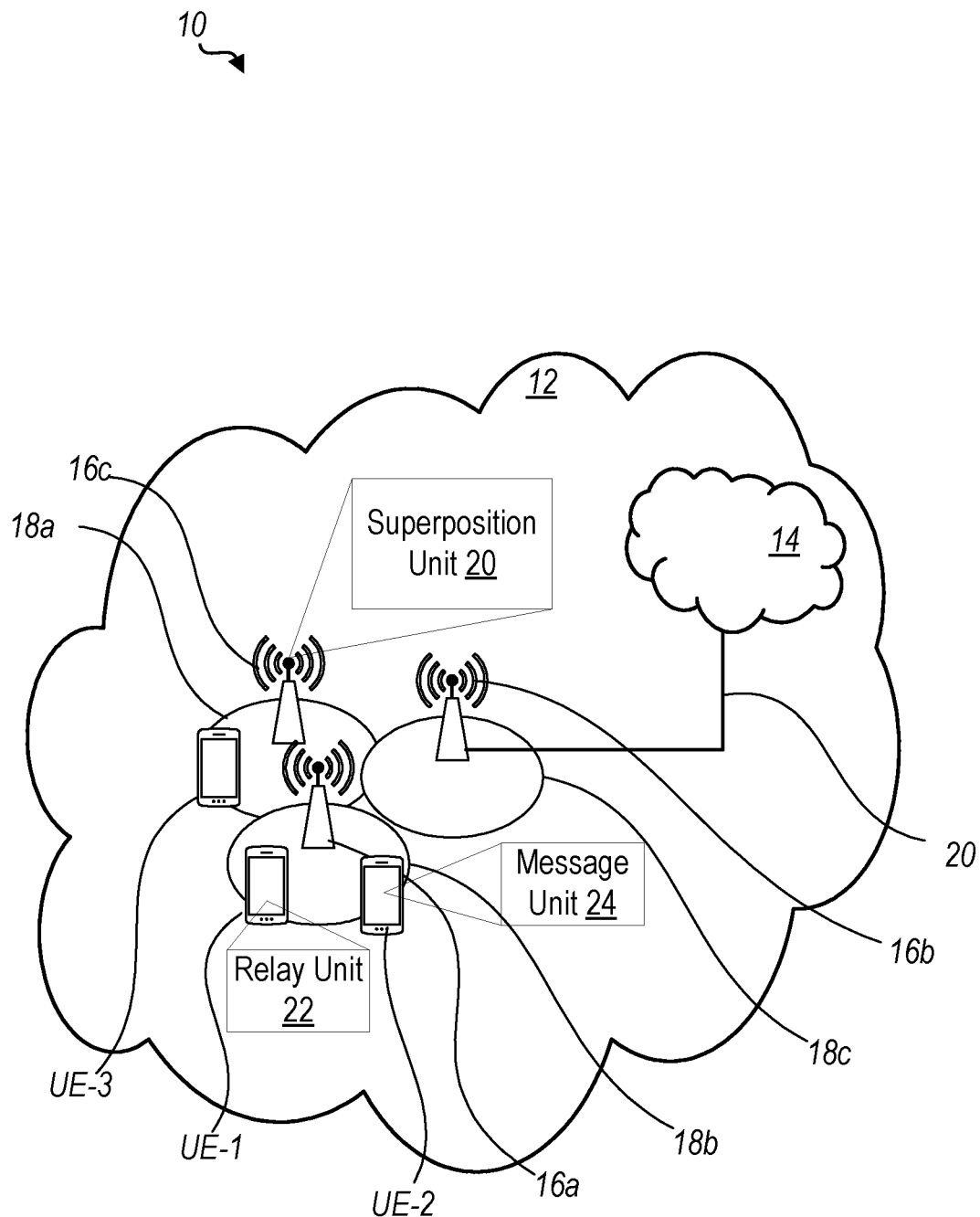
FIG. 3 is a schematic diagram of an exemplary network architecture illustrating a communication system according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection.

A first UE (UE-1) and second UE (UE-2) in coverage area 18b are wirelessly connectable to the corresponding network node 16a. A third use equipment (UE-3) located in coverage area 18a is configured to wirelessly connect to, or be paged by, the corresponding network node 16c. While a plurality of UEs 1-3 (collectively referred to as UEs) are illustrated in this example, the disclosed embodiments are equally applicable to a situation where a sole UE is in the coverage area or where a sole UE is connecting to the corresponding network node 16. Note that although only three UEs and three network nodes 16 are shown for convenience, the communication system may include many more UEs and network nodes 16.

Also, it is contemplated that a UE can be in simultaneous communication and/or configured to separately communicate with more than one network node 16 and more than one type of network node 16. For example, a UE can have dual connectivity with a network node 16 that supports LTE and the same or a different network node 16 that supports NR. As an example, the UE can be in communication with an eNB for LTE/E-UTRAN and a gNB for NR/NG-RAN.

A network node 16 is configured to include a superposition unit 20 which is configured to perform one or more network node 16 functions described herein such as with respect to SSD-based cooperative NOMA. A UE, e.g., UE-1, UE-2 and/or UE-3, is configured to include one or more of relay unit 22 and message unit 24 which are configured to perform one or more UE functions as described herein such as with respect to SSD-based cooperative NOMA. For example, UE, e.g., UE-1 and/or UE-2, may include and/or activate relay unit 22 if, for example, UE is acting and/or performing the functions of a relay UE as described herein. In another example, UE, e.g., UE-2 and/or UE-3, may include and/or activate message unit 24 if, for example, UE is a destination node receiving at least one relayed signal, as described herein.

Example implementations, in accordance with an embodiment, of the UE, e.g., UE-1, UE-2 and/or UE-3, and network node 16 discussed in the preceding paragraphs will now be described with reference to FIG. 4. Communication system 10 includes a network node 16 where network node 16 includes hardware 26 enabling it to communicate with one or more UEs, e.g., UE-1, UE-2 and/or UE-3. The hardware 26 may include a communication interface 28 for setting up and maintaining a wired or wireless connection with an interface of a different communication device of the communication system 10, as well as a radio interface 30 for setting up and maintaining at least a wireless connection with a UE located in a coverage area 18 served by the network node 16. The radio interface 30 may be formed as or may include, for example, one or more RF transmitters, one or more RF receivers, and/or one or more RF transceivers. The communication interface 28 may be configured to facilitate a connection to one or more other entities in system 10 such as with another network node 16. The connection may be direct or it may pass through a core network 14 of the communication system 10 and/or through one or more intermediate networks outside the communication system 10.

In the embodiment shown, the hardware 26 of the network node 16 further includes processing circuitry 32. The processing circuitry 32 may include a processor 34 and a memory 36. In particular, in addition to or instead of a processor 34, such as a central processing unit, and memory, the processing circuitry 32 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 34 may be configured to access (e.g., write to and/or read from) the memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 38 stored internally in, for example, memory 36, or stored in external memory (e.g., database, storage array, network storage device, etc.) accessible by the network node 16 via an external connection. The software 38 may be executable by the processing circuitry 32. The processing circuitry 32 may be configured to control any of the methods and/or processes described herein and/or to cause such methods, and/or processes to be performed, e.g., by network node 16. Processor 34 corresponds to one or more processors 34 for performing network node 16 functions described herein. The memory 36 is configured to store data, programmatic software code and/or other information described herein. In some embodiments, the software 38 may include instructions that, when executed by the processor 34 and/or processing circuitry 32, causes the processor 34 and/or processing circuitry 32 to perform the processes described herein with respect to network node 16. For example, processing circuitry 68 of the network node 16 may include superposition unit 20 for performing one or more network node 16 functions described herein such as with respect to generating a superposed signal, for example.

The communication system 10 further includes the UE, e.g., UE-1, already referred to. The UE, e.g., UE-1, may have hardware 40 that may include a radio interface 42 configured to set up and maintain a wireless connection with a network node 16 serving a coverage area 18 in which the UE is currently located. The radio interface 42 may be formed as or may include, for example, one or more RF transmitters, one or more RF receivers, and/or one or more RF transceivers.

The hardware 40 of the UE, e.g., UE-1, further includes processing circuitry 44. The processing circuitry 44 may include a processor 46 and memory 48. In particular, in addition to or instead of a processor, such as a central processing unit, and memory, the processing circuitry 44 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 46 may be configured to access (e.g., write to and/or read from) memory 48, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE, e.g., UE-1, may further comprise software 50, which is stored in, for example, memory 48 at the UE, or stored in external memory (e.g., database, storage array, network storage device, etc.) accessible by the UE. The software 50 may be executable by the processing circuitry 44. The software 50 may include a client application 52. The client application 52 may be operable to provide a service to a human or non-human user via the UE. The client application 52 may interact with the user to generate the user data that it provides.

The processing circuitry 44 may be configured to control any of the methods and/or processes described herein and/or to cause such methods, and/or processes to be performed, e.g., by UE such as UE-1. The processor 46 corresponds to one or more processors 46 for performing UE functions described herein. The UE, e.g., UE-1, includes memory 48 that is configured to store data, programmatic software code and/or other information described herein. In some embodiments, the software 50 and/or the client application 52 may include instructions that, when executed by the processor 46 and/or processing circuitry 44, causes the processor 46 and/or processing circuitry 44 to perform the processes described herein with respect to the UE, e.g., UE-1. For example, the processing circuitry 44 of the UE, e.g., UE-1, may include a relay unit 22 configured to perform one or more UE functions as described herein such as with respect to SSD-based cooperative NOMA. The processing circuitry 44 may also include message unit 24 configured to perform one or more functions described herein such as with respect to SSD-based cooperative NOMA. Further, the hardware 40 and software 50 discussed with respect to UE-1 is equally applicable to other UEs such as UE-2 and UE-3.

Figure 4:
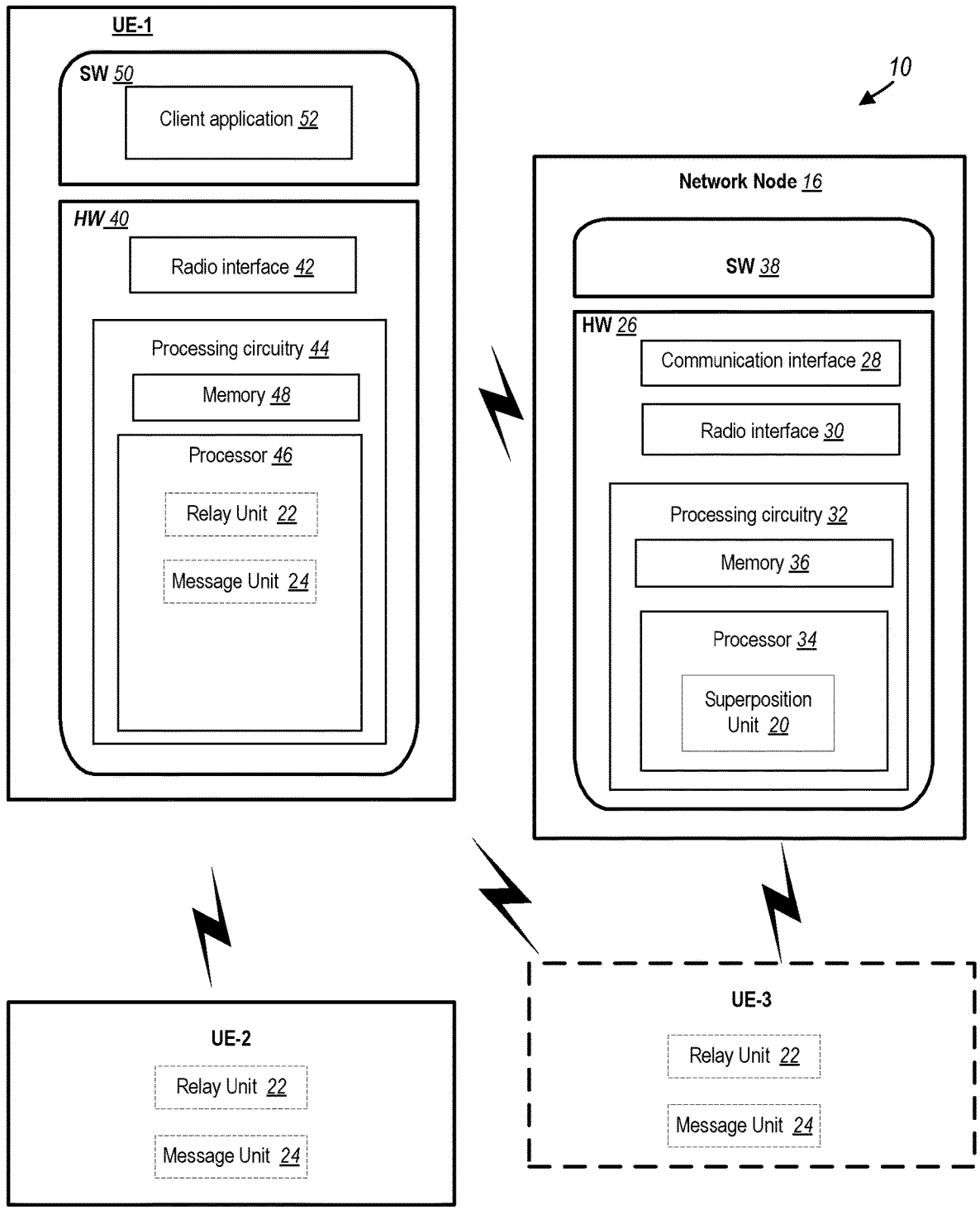
FIG. 4 is a block diagram of network node and UEs of the communication system of FIG. 3 according some embodiments of the present disclosure.

In some embodiments, the inner workings of the network node 16 and UE, e.g., UE-1, may be as shown in FIG. 4 and independently, the surrounding network topology may be that of FIG. 3. The wireless connection between the UE, e.g., UE-1, UE-2 and/or UE-3, and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

In some embodiments, the network node 16 is configured to, and/or the network node's 16 processing circuitry 68 is configured to perform the functions and/or methods described herein for preparing/initiating/maintaining/supporting/ending a transmission to the UE, e.g., UE-1, UE-2 and/or UE-3 and/or preparing/terminating/maintaining/supporting/ending in receipt of a transmission from the UE, e.g., UE-1, UE-2 and/or UE-3.

In some embodiments, the UE, e.g., UE-1, UE-2 and/or UE-3, is configured to, and/or comprises a radio interface 42 and/or processing circuitry 44 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as superposition unit 20, relay unit 22 and message unit 24 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
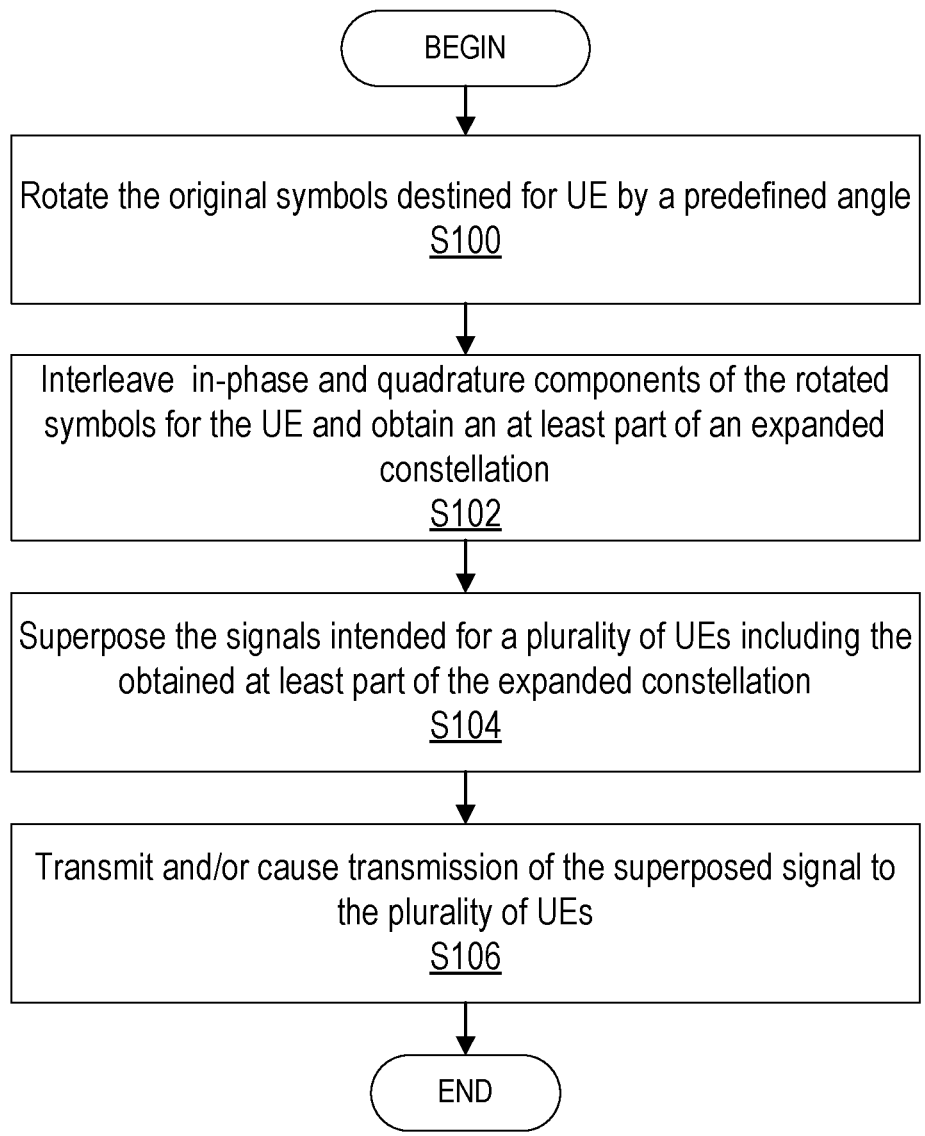
FIG. 5 is a flowchart of an exemplary process in a network node according to some embodiments of the present disclosure

FIG. 5 is a flowchart of an exemplary process in a network node 16 according to one or more embodiments of the present disclosure. One or more Blocks and/or functions performed by network node 16 may be performed by one or more elements of network node 16 such as by superposition unit 20 in processing circuitry 32, processor 34, radio interface 30, etc. In one or more embodiments, network node 16 such as via one or more of superposition unit 20, processing circuitry 32, processor 34, radio interface 30 is configured to rotate (Block S100) the original symbols (e.g., $s_{UE-2}^1$, $s_{UE-2}^2$) destined for UE (e.g., UE-2) by a predefined angle, as described herein.

In one or more embodiments, network node 16 such as via one or more of superposition unit 20, processing circuitry 32, processor 34, radio interface 30 is configured to interleave (Block S102) in-phase and quadrature components of the rotated symbols for the UE (e.g., UE-2), and obtain $\lambda_{UE}^1$ (e.g., $\lambda_{UE-2}^1$ or at least part of an expanded constellation), as described herein. In one or more embodiments, network node 16 such as via one or more of superposition unit 20, processing circuitry 32, processor 34, radio interface 30 is configured to superpose (Block S104) the signals intended for a plurality of UEs (e.g., UE-1, UE-2) including the obtained $\lambda_{UE}^1$ (i.e., at least part of an expanded constellation), as described herein. For example, assuming a superposed symbol for UE-1 and UE-2 where the symbols destined for UE-2 are rotated, the superposed signal is as follows: $\sqrt{a_{UE-1}P_t}s_{UE-1}^1 + \sqrt{a_{UE-2}P_t}\lambda_{UE-2}^1$, where $s_{UE-1}^1$ may correspond to a constellation point in the original constellation and $\lambda_{UE-2}^1$ is part of the expanded constellation described herein. In one or more embodiments, network node 16 such as via one or more of superposition unit 20, processing circuitry 32, processor 34, radio interface 30 is configured to transmit (Block S106) and/or cause transmission of the superposed signal to the plurality of UEs (e.g., UE-1, UE-2), as described herein.

Block S100-S106 may be repeated with respect to components of rotated symbols that were not transmitted during a previous time slot such as when performing four slot SSD-based cooperative NOMA, as described herein.

Figure 6:
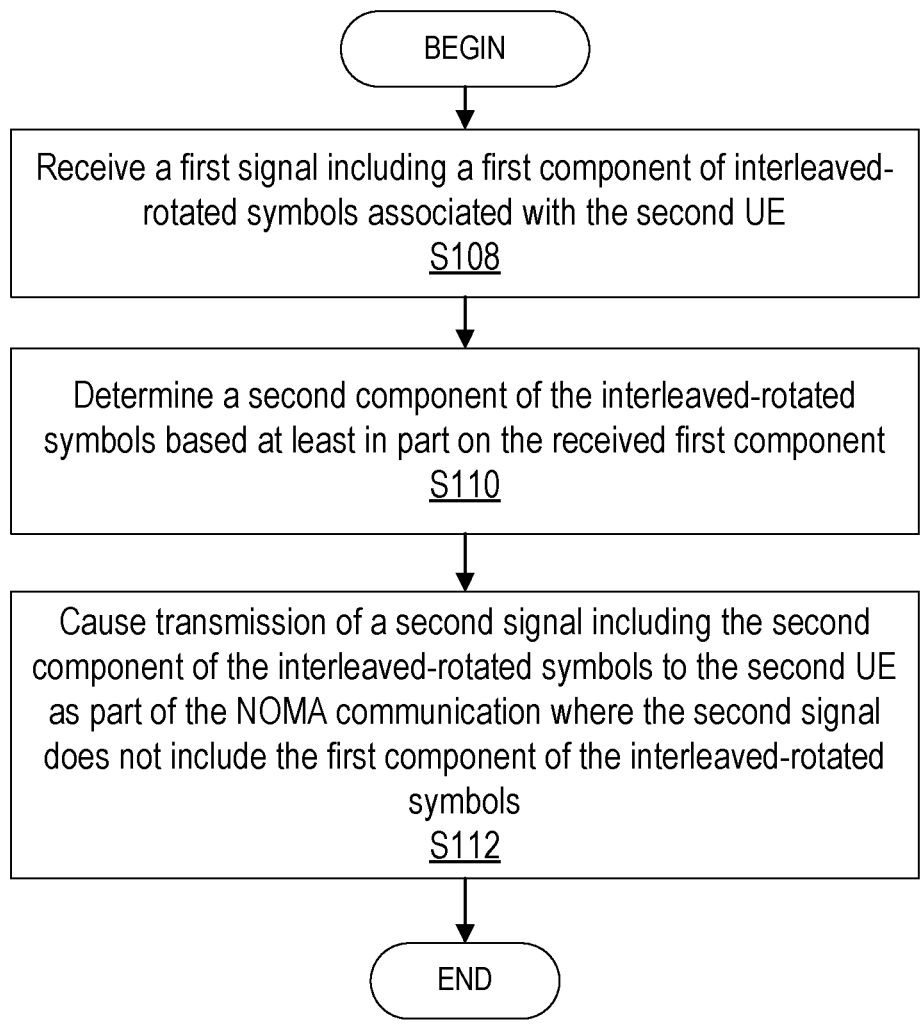
FIG. 6 is a flowchart of an exemplary process in a UE according to some embodiments of the present disclosure.

FIG. 6 is a flowchart of an exemplary process in a UE (i.e., first UE, for example, where the first UE is a relay UE such as UE-1 and/or UE-2) according to one or more embodiments of the present disclosure. One or more Blocks and/or functions performed by UE, e.g., UE-1 and/or UE-2, may be performed by one or more elements of UE, e.g., UE-1 and/or UE-2, such as by relay unit 22 in processing circuitry 44, processor 46, radio interface 42, etc. In one or more embodiments, UE, e.g., UE-1 and/or UE-2, such as via one or more of processing circuitry 44, processor 46, relay unit 22 and radio interface 42 is configured to receive (Block S108) a first signal including a first component of interleaved-rotated symbols associated with a second UE (e.g., UE-2), as described herein. In one or more embodiments, UE (e.g., UE-1) such as via one or more of processing circuitry 44, processor 46, relay unit 22 and radio interface 42 is configured to determine (Block S110) a second component of the interleaved-rotated symbols based at least in part on the received first component. In one or more embodiments, UE (e.g., UE-1) such as via one or more of processing circuitry 44, processor 46, relay unit 22 and radio interface 42 is configured to cause (Block S112) transmission of a second signal including the second component of the interleaved-rotated symbols to the second UE (e.g., UE-2) as part of the NOMA communication where the second signal does not include the first component of the interleaved-rotated symbols.

According to one or more embodiments, the determining of the second component of the interleaved-rotated symbols includes: decoding the first component of the interleaved-rotated symbols into deinterleaved-rotated first and second symbols, interleaving the deinterleaved-rotated components of the rotated symbols to generate the second component of the interleaved-rotated symbols that was not included in the first signal. According to one or more embodiments, the determining of the second component of the interleaved-rotated symbols includes: decoding the first component of the interleaved-rotated symbols to generate deinterleaved and unrotated first and second original symbols, rotating the first and second original symbols to generate rotated first and second symbols; and interleaving the rotated components of the rotated symbols to generate the second component of the interleaved-rotated symbols that was not included in the first signal.

According to one or more embodiments, the first signal is a superimposed signal including the first component of interleaved-rotated symbols associated with the second UE (e.g., UE-2) and another component of interleaved-rotated symbols associated with the first UE (e.g., UE-1), where the second signal does not include components of interleaved-rotated symbols associated with the first UE (e.g., UE-1). According to one or more embodiments, the first signal is received in a first time slot and the second signal is transmitted in a second time slot where the second time slot occurs after the first time slot.

According to one or more embodiments, the processing circuitry 44 is further configured to: receive, in a third time slot, a third signal including the second component of interleaved-rotated symbols associated with the second UE (e.g., UE-2), determine the first component of the interleaved-rotated symbols based at least in part on the received first component of the interleaved-rotated symbols, and cause transmission, in a fourth time slot occurring after the third time slot, of a fourth signal including the first component of the interleaved-rotated symbols to the second UE (e.g., UE-2) as part of the NOMA communication where the fourth signal does not include the second component of the interleaved-rotated symbols. According to one or more embodiments, the first component of interleaved-rotated symbols corresponds to interleaved in-phase and quadrature components of rotated symbols.

According to one or more embodiments, the first UE (e.g., UE-1) is a relay UE communicating with the second UE (e.g., UE-2) over a wireless communication channel having a higher signal to noise ratio (SNR) than other wireless communication channels between the second UE (e.g., UE-2) and other UEs (e.g., UE-3). According to one or more embodiments, the first and second components of the interleaved-rotated symbols are part of an expanded constellation of symbols that is expanded from a rotated constellation of rotated symbols. According to one or more embodiments, the rotated constellation of symbols corresponds to a rotation of an original constellation of original symbols by a predefined quantity. According to one or more embodiments, the predefined quantity of rotation is based at least in part on a signal-to-interference-plus-noise ratio, SINR.

Figure 7:
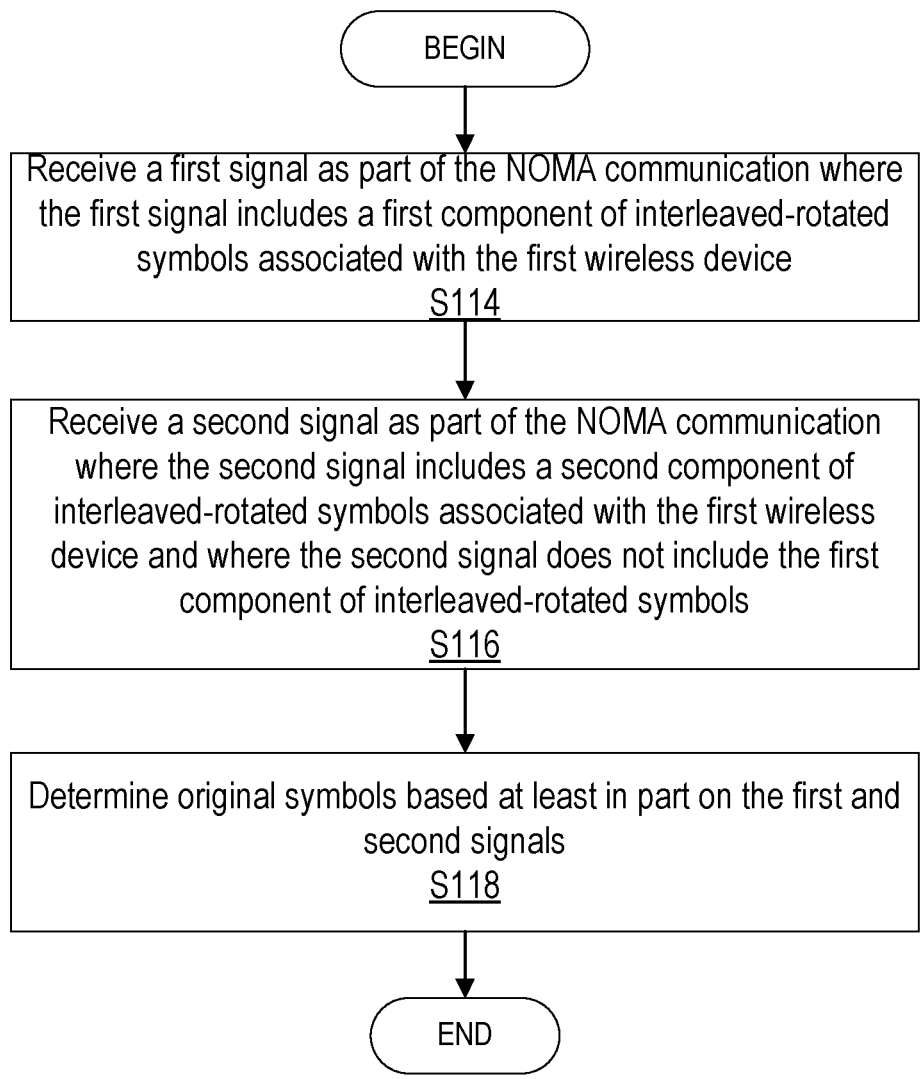
FIG. 7 is a flowchart of another exemplary process in a UE according to some embodiments of the present disclosure.

FIG. 7 is a flowchart of an exemplary process in a UE (i.e., first UE, for example, where the first UE is a destination UE such as UE-2 and/or UE-3) according to one or more embodiments of the present disclosure. One or more Blocks and/or functions performed by UE (e.g., UE-2) may be performed by one or more elements of UE (e.g., UE-2) such as by message unit 24 in processing circuitry 44, processor 46, radio interface 42, etc. In one or more embodiments, UE (e.g., UE-2) such as via one or more of processing circuitry 44, processor 46, message unit 24 and radio interface 42 is configured to receive (Block S114) a first signal as part of the NOMA communication where the first signal includes a first component of interleaved-rotated symbols associated with the first UE (e.g., UE-2), as described herein. In one or more embodiments, UE (e.g., UE-2) such as via one or more of processing circuitry 44, processor 46, message unit 24 and radio interface 42 is configured to receive (Block S116) a second signal as part of the NOMA communication where the second signal includes a second component of interleaved-rotated symbols associated with the first UE (e.g., UE-2) and where the second signal does not includes the first component of interleaved-rotated symbols, as described herein. In one or more embodiments, UE (e.g., UE-2) such as via one or more of processing circuitry 44, processor 46, message unit 24 and radio interface 42 is configured to determine (Block S118) original symbols based at least in part on the first and second signals.

According to one or more embodiments, the first signal is a superposed signal that includes the first component of interleaved-rotated symbols associated with the first UE (e.g., UE-2) and another component of interleaved-rotated symbols associated with the second UE (e.g., UE-1), as described herein. According to one or more embodiments, the first signal is received in a first time slot and the second signal is transmitted in a second time slot that occurs after the first time slot. According to one or more embodiments, the processing circuitry 44 is further configured to receive a third signal during a third time slot as part of the NOMA communication where the third signal including the second component of interleaved-rotated symbols associated with the first UE (e.g., UE-2), and receive a fourth signal during a fourth time slot as part of the NOMA communication where the fourth signal includes the first component of interleaved-rotated symbols associated with the first UE (e.g., UE-2) and where the fourth signal does not include the second component of interleaved-rotated symbols. The determining of the original symbols is further based at least in part on the third and fourth signals.

According to one or more embodiments, the first component of interleaved-rotated symbols corresponds to interleaved in-phase and quadrature components of rotated symbols. According to one or more embodiments, the second UE (e.g., UE-1) is a relay UE communicating with the first UE (e.g., UE-2) over a channel having a higher signal to noise ratio (SNR) than other channels between the first UE (e.g., UE-2) and other UEs (e.g., UE-3). According to one or more embodiments, the first and second components of the interleaved-rotated symbols are part of an expanded constellation of symbols that is expanded from a rotated constellation of rotated symbols. According to one or more embodiments, the rotated constellation of symbols corresponds to a rotation of an original constellation of original symbols by a predefined quantity.

According to one or more embodiments, the predefined quantity of rotation is based at least in part on a signal-to-interference-plus-noise ratio, SINR. According to one or more embodiments, the processing circuitry 44 is further configured to: receive at least one other signal including the second component of interleaved-rotated symbols associated with the first UE (e.g., UE-2) from at least one other UE (e.g., UE-3), and determine the second signal including the second component of interleaved-rotated symbols associated with the first UE (e.g., UE-2) having a higher SNR than the at least one other signal. The determining of the original symbols not being based at least in part on the at least one other signal including the second component. According to one or more embodiments, the first signal is received from the network node 16 and the second signal is received from the second UE (e.g., UE-1) acting as a relay node.

Having described the general process flow of arrangements of the disclosure and having provided examples of hardware and software arrangements for implementing the processes and functions of the disclosure, the sections below provide details and examples of arrangements for SSD-based cooperative NOMA that may optionally include best relay node selection.

Embodiments provide for SSD-based cooperative NOMA that may optionally include best relay node selection.

Having generally described arrangements for SSD-based cooperative NOMA that may optionally include best relay node selection, details for these arrangements, functions and processes are provided as follows, and which may be implemented by the network node 16 and/or UE.

Figure 8:
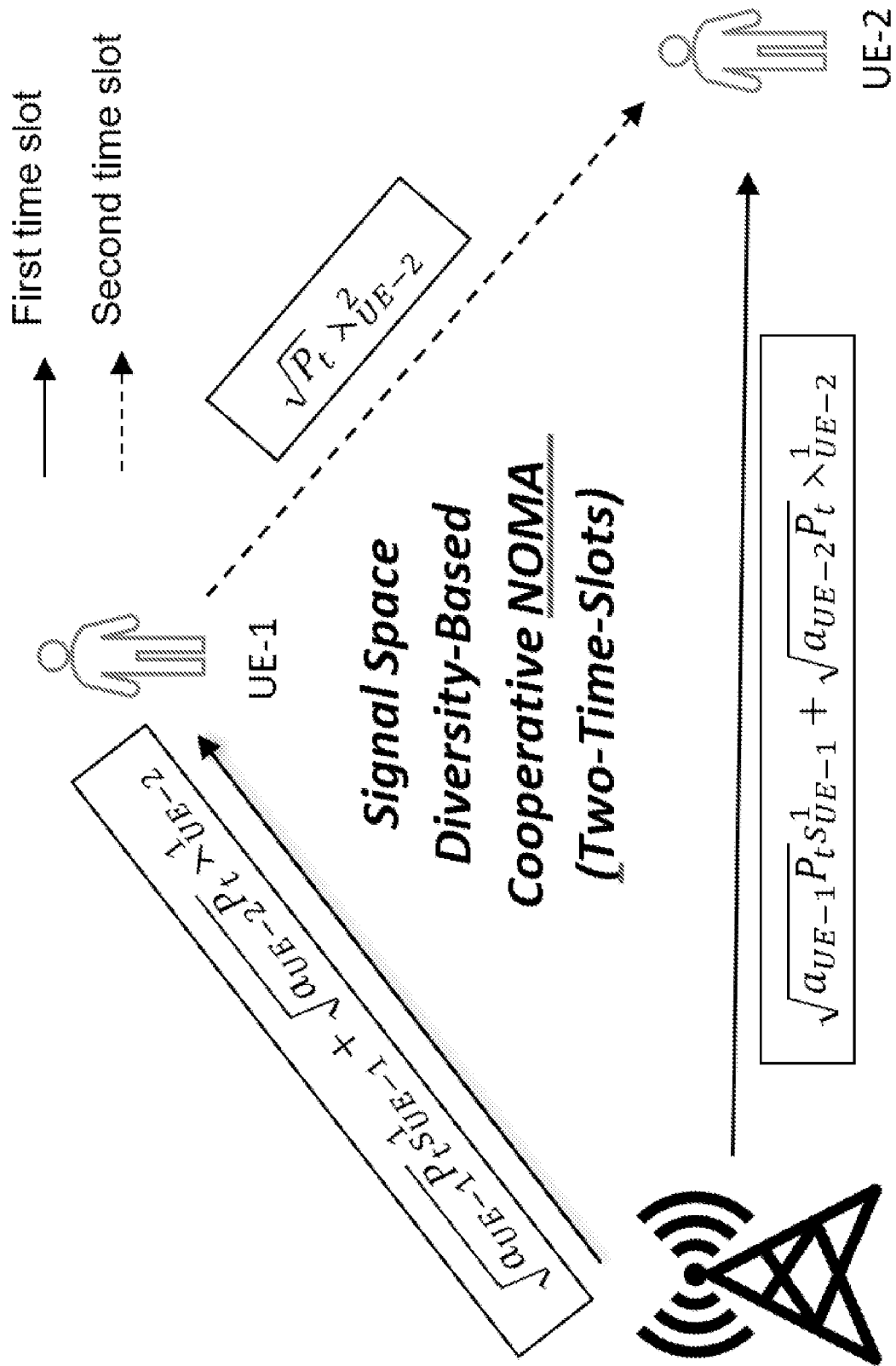
FIG. 8 is a diagram of an example signal space diversity based cooperative NOMA for two time slots according to some embodiments of the present disclosure.

To further increase the reception reliability at a UE (e.g., UE-2) in cooperative NOMA networks, cooperative diversity is combined with modulation diversity as illustrated in FIG. 8 that is a diagram of an example two UE two-time-slots SSD based cooperative NOMA system according to one or more embodiments of the disclosure. In one or more embodiments, UE-1 is associated with a stronger channel condition than the channel condition of UE-2. Different from known cooperative NOMA networks, one copy of two different symbols of UE-2 is sent in two time slots, rather than two copies of one symbol. Also, the in-phase and quadrature-phase components of the original symbols for UE-2 may be sent through two independent channels. For example, a first component ($\lambda_{UE-2}^1$) may be sent to UE-2 by network node 16 while a second component ($\lambda_{UE-2}^2$) may be sent to UE-2 by UE-1.

Figure 9:
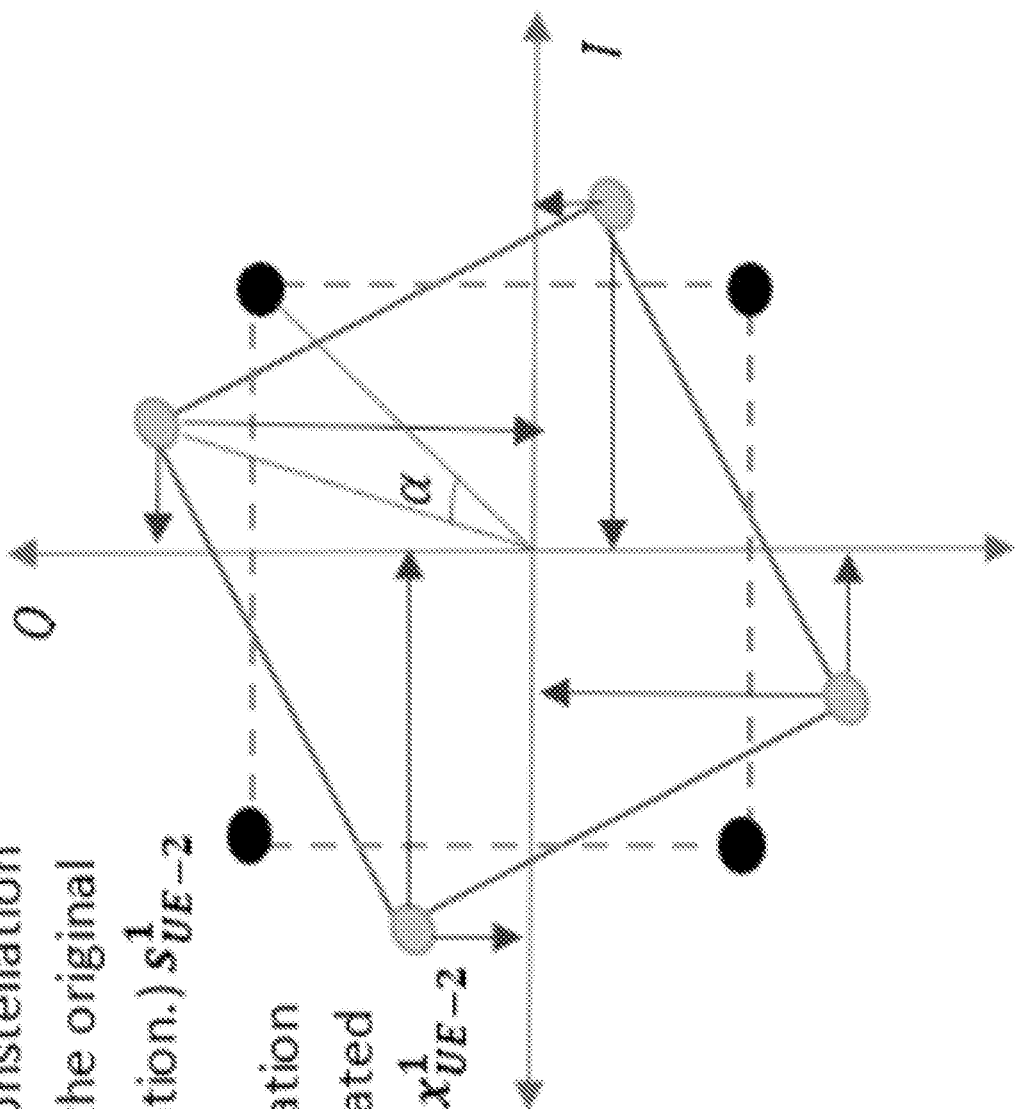
FIG. 9 is a diagram of an example constellation rotation according to some embodiments of the present disclosure.

More particularly, the original symbols destined for UE-2 are first rotated such as via one or more of processing circuitry 32, superposition unit 20, processing circuitry 44, relay unit 22, etc. by a certain/predefined angle, and after this rotation, the in-phase and the quadrature-phase components of the rotated symbols carry enough information to uniquely represent the original symbols. Next, the components of pairs of the rotated symbols are interleaved such as via one or more of processing circuitry 32, superposition unit 20, processing circuitry 44, relay unit 22, etc., and the new symbols (e.g., $\lambda_{UE}^1$, $\lambda_{UE}^2$) are obtained for transmission. Later, the in-phase and quadrature-phase components of the original symbols may be respectively sent from the network node 16 such as via radio interface 30 in the direct transmission phase, and from UE-1 such as via radio interface 42 in the cooperative transmission phase. Then, UE-2 reorders such as via one or more of processing circuitry 44, message unit 24, etc. the received components from UE-1 and network node 16 to recover the original symbols. One or more of these above described steps may be described mathematically by the one or more of the following steps:

Step: Obtaining New Constellation Points to be Transmitted:

The original constellation for UE-2 is rotated by θ such as via one or more of processing circuitry 32, superposition unit 20, etc., rotation angle in 2-D signal space, to obtain a rotated constellation, x as illustrated in FIG. 9. After interleaving the components of pairs of signal points such as via one or more of processing circuitry 32, superposition unit 20, etc., the new constellation points belonging to the expanded constellation, $\kappa = Re\{\chi\} \times Im\{\chi\}$ are obtained. For instance, it is assumed that $x_{UE-2}^1$, and $x_{UE-2}^2$ are two signal points from the rotated constellation, $\chi$. When the components of $x_{UE-2}^1$, and $x_{UE-2}^2$ are interleaved, the new constellation points may be as follows: $\lambda_{UE-2}^1 = Re\{x_{UE-2}^1\} + jIm\{x_{UE-2}^2\}$, and $\lambda_{UE-2}^2 = Re\{x_{UE-2}^2\} + jIm\{x_{UE-2}^1\}$, and $\lambda_{UE-2}^1, \lambda_{UE-2}^2 \in \Lambda$.

19

Next Step: Direct Transmission Phase (First Time-Slot as Illustrated, for Example, in FIG. 8):

Received signal, at UE-1, from network node 16 may be expressed as follows:

$y_{UE-1}^{Direct} = h_1(\sqrt{a_{UE-1}P_t}s_{UE-1}^1 + \sqrt{a_{UE-2}P_t}\lambda_{UE-2}^1) + n_{UE-1}$, where $n_{UE-1}$ is additive white Gaussian noise (AWGN).

After the detection of the received signal using SIC such as via one or more of processing circuitry 44, relay unit 22, radio interface 42, etc., UE-1 knows UE-2's symbol, $\lambda_{UE-2}^1$, that belongs to the expanded constellation, A, in which all members consist of two components, each of which uniquely identifies a particular member of $\chi$. Thus, decoding a member of the expanded constellation results in decoding two different members of the original constellation. In other words, detecting $\lambda_{UE-2}^1$ leads to detecting both $x_{UE-2}^1$, and $x_{UE-2}^2$, at UE-1. For example, the relay UE (e.g., UE-2) may decode such as via one or more of processing circuitry 44, relay unit 22, radio interface 42, etc. the received signal down to the original constellation and then regenerate the rotated constellation or the relay UE may decode the received signal down to the rotated constellations, and then, using a look-up table, regenerate the second component of the interleaved-rotated symbols.

Received signal, at UE-2, from network node 16 may be expressed as follows:

$y_{UE-2}^{Direct} = h_2(\sqrt{a_{UE-1}P_t}s_{UE-1}^1 + \sqrt{a_{UE-2}P_t}\lambda_{UE-2}^1) + n_{UE-2}$, where $n_{UE-2}$ is AWGN.

Next Step: Cooperative Transmission Phase (Second Time-Slot as Illustrated, for Example, in FIG. 8):

UE-1 interleaves the components of $x_{UE-2}^1$, and $x_{UE-2}^2$ such as via one or more of processing circuitry 44, relay unit 22, radio interface 42, etc., which are not transmitted in the direct transmission phase, i.e., $\lambda_{UE-2}^2 = \text{Re}\{x_{UE-2}^2\} + j\text{Im}\{x_{UE-2}^1\}$. Then, the obtained symbol may be transmitted such as via radio interface 42 to UE-2. In one or more examples, signal $\sqrt{P_t}\lambda_{UE-2}^2$ is transmitted to UE-2.

Received signal, at UE-2, from UE-1 may be expressed as follows:

$y_{UE-2}^{Cooperative} = h_3(\sqrt{P_t}\lambda_{UE-2}^2) + \tilde{n}_{UE-2}$, where $\tilde{n}_{UE-2}$ is AWGN.

By comparing the received signals, at UE-2, from network node 16 and UE-1, it may be observed that the received signal from UE-1 contains components of the original signal that are not included in the received signal from network node 16. Hence, from UE-2's perspective, different components of each member of the original signal, are affected by independent channel fading as, for example, different components traverse different paths to UE-2. To detect the original message, UE-2 reorders the received components such as via one or more of processing circuitry 44, message unit 24, radio interface 42, etc. such that the corresponding components of each signal point can join together.

The received signals may be expressed as follows:

$y = (\text{Re}\{h_2 * y_{UE-2}^{Direct}\}, \text{Im}\{h_2 * y_{UE-2}^{Direct}\}, \text{Re}\{h_3 * y_{UE-2}^{Cooperative}\}, \text{Im}\{h_3 * y_{UE-2}^{Cooperative}\})$.

Then, the UE-2 applies such as via one or more of processing circuitry 44, message unit 24, radio interface 42, etc. a maximum likelihood (ML) detector on the reordered signal to detect the source message. UE-2's ML decision rule can be expressed as follows:

$\hat{x}_{UE-2}^1 = \arg\min_{x_{UE-2}^1 \in \chi} \left\{ \left|\text{Re}\{h_2^* y_{UE-2}^{Direct}\} - |h_2|^2 \sqrt{a_{UE-2}P_t} \text{Re}\{x_{UE-2}^1\}\right|^2 + \right.$

20

Figure 10:
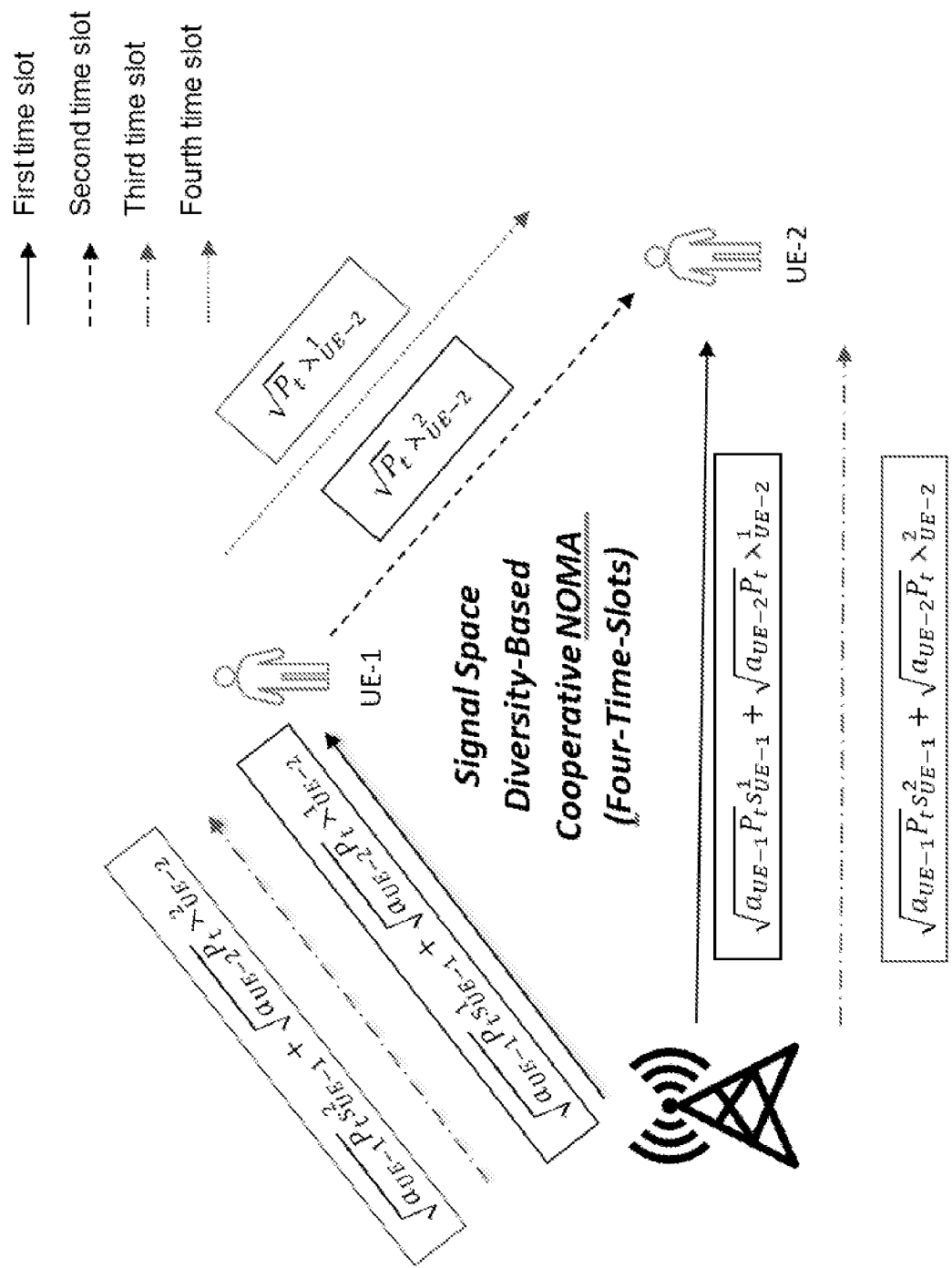
FIG. 10 is a diagram of an example signal space diversity based cooperative NOMA for four time slots according to some embodiments of the present disclosure.

-continued $\left. \left|\text{Im}\{h_3^* y_{UE-2}^{Cooperative}\} - |h_3|^2 \sqrt{P_t} \text{Im}\{x_{UE-2}^1\}\right|^2 \right\}$ $\hat{x}_{UE-2}^2 = \arg\min_{x_{UE-2}^1 \in \chi} \left\{ \left|\text{Im}\{h_2^* y_{UE-2}^{Direct}\} - |h_2|^2 \sqrt{a_{UE-2}P_t} \text{Im}\{x_{UE-2}^1\}\right|^2 + \right.$ $\left. \left|\text{Re}\{h_3^* y_{UE-2}^{Cooperative}\} - |h_3|^2 \sqrt{P_t} \text{Re}\{x_{UE-2}^1\}\right|^2 \right\}$ Another example, of SSD-based cooperative NOMA is illustrated in FIG. 10 where four time slots are used.

In the two-time-slots SSD-based cooperative NOMA scheme illustrated in FIG. 8, the spatial diversity may not be fully exploited as UE-2 may receive only a single copy of two different symbols in two time-slots, and unlike the conventional cooperative systems, there are no other copies of these two symbols to leverage spatial diversity. Hence, the example of FIG. 10 advantageously provides a four-time-slots SSD-based cooperative NOMA scheme, in which UE-2 receives two copies of two different symbols in four time-slots, thereby taking full advantage of spatial diversity. More particularly, this scheme may be implemented as follows: The first two time-slots in FIG. 10 may follow the two-time-slots SSD-based cooperative NOMA scheme illustrated in FIG. 8, but the third and fourth time-slots may be executed as follows:

Next Step: Direct Transmission Phase (Third Time-Slot as Illustrated, for Example, in FIG. 10):

Received signal, at UE-1, from network node 16 may be expressed as follows:

$y_{UE-1}^{Direct} = h_4(\sqrt{a_{UE-1}P_t}s_{UE-1}^2 + \sqrt{a_{UE-2}P_t}\lambda_{UE-2}^2) + \hat{n}_{UE-1}$, where $\hat{n}_{UE-1}$ is additive white Gaussian noise (AWGN).

After the detection of the received signal using SIC such as via one or more of processing circuitry 44, relay unit 22, radio interface 42, etc., UE-1 knows UE-2's symbol, $\lambda_{UE-2}^2$, that belongs to the expanded constellation, Λ, in which all members consist of two components, each of which uniquely identifies a particular member of $\chi$. Thus, decoding a member of the expanded constellation results in decoding two different members of the original constellation. In other words, detecting $\lambda_{UE-2}^2$ such as via one or more of processing circuitry 44, relay unit 22, radio interface 42, etc. leads to detecting both $x_{UE-2}^1$, and $x_{UE-2}^2$, at UE-1.

Received signal, at UE-2, from Network node 16 may be expressed as follows:

$y_{UE-2}^{Direct} = h_5(\sqrt{a_{UE-1}P_t}s_{UE-1}^2 + \sqrt{a_{UE-2}P_t}\lambda_{UE-2}^2) + \hat{n}_{UE-2}$, where $\hat{n}_{UE-2}$ is AWGN.

Next Step: Cooperative Transmission Phase (Fourth Time-Slot as Illustrated, for Example, in FIG. 10):

UE-1 interleaves such as via one or more of processing circuitry 44, relay unit 22, radio interface 42, etc. the components of $x_{UE-2}^1$, and $x_{UE-2}^2$, which are not transmitted in the direct transmission phase, i.e., $\lambda_{UE-2}^1 = \text{Re}\{x_{UE-2}^1\} + j\text{Im}\{x_{UE-2}^2\}$. Then, the obtained symbol may be transmitted such as via radio interface 42 to UE-2. For example, UE-1 transmits $\sqrt{P_t}\lambda_{UE-2}^1$ to UE-2.

Received signal, at UE-2, from UE-1 may be expressed as follows:

$y_{UE-2}^{Cooperative} = h_6(\sqrt{P_t}\lambda_{UE-2}^1) + \check{n}_{UE-2}$, where $\check{n}_{UE-1}$ is AWGN.

Different from the two-time-slots SSD-based cooperative NOMA scheme described herein, the ML detection may be implemented at the fourth time-slot, not at the second time-slot, such as to allow for detection of the source message.

Therefore, this four slot scheme advantageously allows for the full spatial diversity to be taken advantage of as UE-2 may receive two copies of two different symbols in four time-slots for source message detection.

Signal Space Diversity-Based Cooperative NOMA Four-Time-Slots Protocol: NOMA-Cluster Size of 3-Users and Relaying-Node Selection This section describes another example protocol for the case when the NOMA cluster size is three UEs and the best-relaying-node selection is implemented to help boost the performance. In this example, one aim is to improve transmission reliability for only UE-3 (i.e., destination UE) by using the technique of the best relaying-node selection. More particularly, there may be only one active relay in the second and fourth time-slots where the best UE or relay UE that has better communication characteristic(s) than the other UEs that may be able to serve as relay UEs to UE-3, in this example. The other UEs with weaker channel conditions may remain inactive for relaying. This single relaying-node is chosen based on a predefined strategy such as based on one or more communication characteristics (i.e., criterion or criteria) such as SNR. In one or more embodiments, to help increase the transmission reliability, reactive selection criterion that maximizes the received SNR by UE-3 may be considered.

Figure 11:
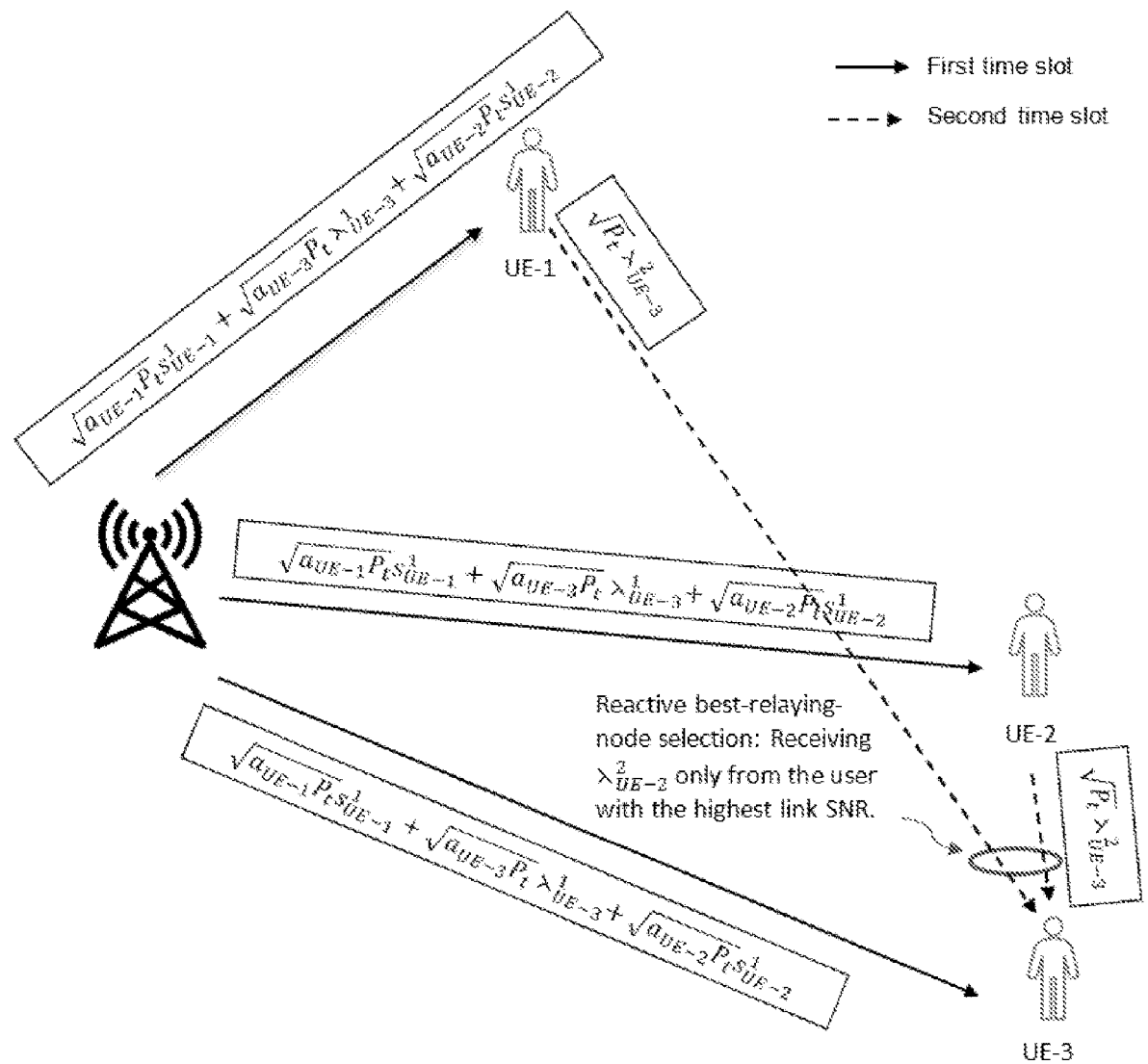
FIG. 11 is a diagram of an example of signal space diversity based cooperative NOMA for four time slots and 3 UEs where the first and second time slots are illustrated, according to some embodiments of the present disclosure.
Figure 12:
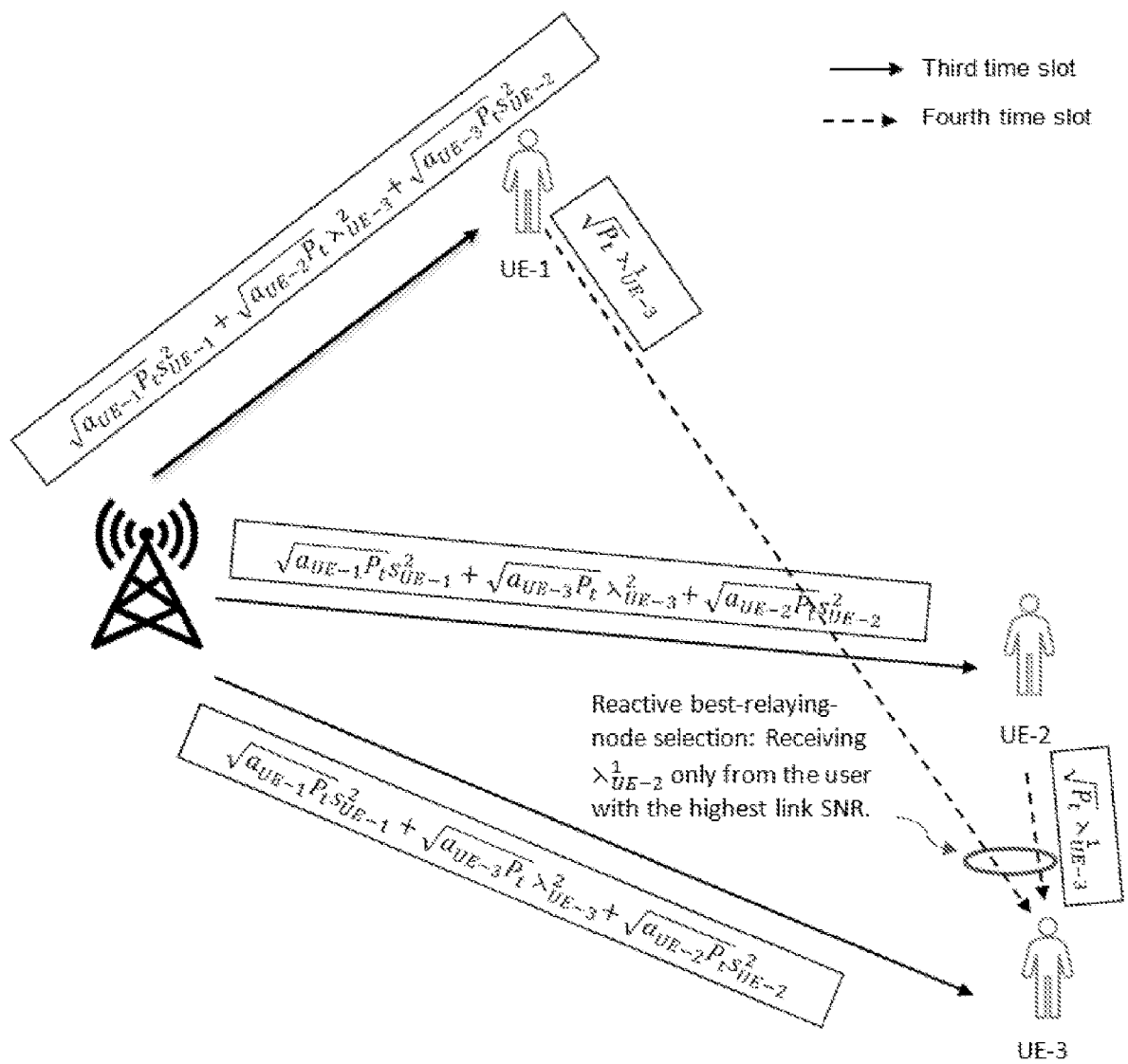
FIG. 12 is a diagram of an example of signal space diversity based cooperative NOMA for four time slots and 3 UEs where the third and fourth time slots are illustrated, according to some embodiments of the present disclosure.

Details of this example protocol are provided with respect to FIGS. 11 and 12 that illustrate four time slots for a three-UE two-time-slots SSD-based cooperative NOMA system with the best-relaying node selection according to one or more embodiments of the disclosure. In particular, FIG. 11 illustrates an example of first and second time slots for a three-UE (e.g., UE-1 to UE-3) two-time-slots SSD-based cooperative NOMA system with the best-relaying node selection according to one or more embodiments of the disclosure. Details of FIG. 11 are provided below.

First Time-Slot:

Step-1: At the network node 16, rotate such as via one or more of processing circuitry 32, superposition unit 20, radio interface 30, etc. the original symbols (i.e., $s_{UE\text{-}3}^1$, $s_{UE\text{-}3}^2$) aimed, i.e., destined, to UE-3 by a certain or predefined angle.

Step-2: Interleave in-phase and quadrature components of the rotated symbols for UE-3, and obtain $\lambda_{UE\text{-}3}^1$, such as via one or more of processing circuitry 32, superposition unit 20, radio interface 30, etc.

Step-3: Superpose such as via one or more of processing circuitry 32, superposition unit 20, radio interface 30, etc. the signals intended for the three NOMA UEs, e.g., UE-1, UE-2 and UE-3, to obtain superposed signal $\sqrt{a_{UE\text{-}1}P_t}s_{UE\text{-}1}^1 + \sqrt{a_{UE\text{-}3}P_t}\lambda_{UE\text{-}3}^1 + \sqrt{a_{UE\text{-}2}P_t}s_{UE\text{-}2}^1$.

Step-4: Transmit such as via radio interface 30 the superposed signal to UE-1, UE-2 and UE-3.

Second Time-Slot:

Step-5: such as via one or more of processing circuitry 44, relay unit 22, radio interface 42, etc., use SIC, UE-1 and UE-2 decode their own message signals (i.e., $s_{UE\text{-}1}^1$, $s_{UE\text{-}2}^1$), and the message signal of UE-3 (i.e., $\lambda_{UE\text{-}3}^1$), which leads to UE-1 and UE-2 acquiring $s_{UE\text{-}3}^1, s_{UE\text{-}3}^2$.

Step-6: Selection of the best relaying-node based on the predefined criterion. For example, in one or more embodiments, a determination is performed as to which one of the UEs (e.g., UE-1, UE-2) should relay the signal. In one or more embodiments, network node 16 performs such as via one or more of processing circuitry 32, superposition unit 20, etc. this determination and signals the best relaying node index to the UE that is to relay the message/signal. In one or more embodiments, the UE performs this determination such as via one or more of processing circuitry 44, relay unit 22, radio interface 42, etc. While FIG. 11 illustrates UE-1 and UE-2 transmitting relayed signals to UE-3, in one or more embodiments using best relaying-node, only one of UE-1 and UE-2 transmit a relayed signal to UE-3. In one or more embodiments, the selection may be omitted such as if UE-3 determines the relayed signals to use from UE-1 and UE-2.

Step-7: At the relaying-node (e.g., UE-1 or UE-2), rotate the original symbols aimed or destined to UE-3 by a certain or predefined angle such as via one or more of processing circuitry 44, relay unit 22, radio interface 42, etc.

Step-8: Via one or more of processing circuitry 44, relay unit 22, radio interface 42, etc., interleave in-phase and quadrature components of the symbols of UE-3 which are not transmitted in the first time-slot such as to obtain $\lambda_{UE\text{-}3}^2$.

Step-9: Transmit such a via radio interface 42, the message signal, i.e., $\sqrt{P_t}\lambda_{UE\text{-}3}^2$, of UE-3 from this relaying-node (e.g., UE-1 or UE-2).

Therefore, after the first and second slots, UE-3 receives a copy of two different symbols in two time-slots.

Referring back to FIG. 12, an example of the third and four time slots for a three-UE two-time-slots SSD-based cooperative NOMA system with the best-relaying node selection according to one or more embodiments of the disclosure is illustrated. The details to FIG. 12 are continuation from FIG. 11 and are illustrated below.

Third Time-Slot:

Step-10: At the network node 16, rotate such as via one or more of processing circuitry 32, superposition unit 20, radio interface 30, etc. the original symbols aimed to UE-3 by a certain or predefined angle.

Step-11: such as via one or more of processing circuitry 32, superposition unit 20, radio interface 30, etc., interleave in-phase and quadrature components of the rotated symbols for UE-3 which are not transmitted in the first time-slot to obtain $\lambda_{UE\text{-}3}^2$.

Step-12: Superpose such as via one or more of processing circuitry 32, superposition unit 20, radio interface 30, etc. the signals intended for the three NOMA UEs, e.g., UE-1, UE-2, and UE-3, and obtain $\sqrt{a_{UE\text{-}1}P_t}s_{UE\text{-}1}^2 + \sqrt{a_{UE\text{-}3}P_t}\lambda_{UE\text{-}3}^2 + \sqrt{a_{UE\text{-}2}P_t}s_{UE\text{-}2}^2$ Step-13: Transmit such as via radio interface 30 the superposed signal $\sqrt{a_{UE\text{-}1}P_t}s_{UE\text{-}1}^2 + \sqrt{a_{UE\text{-}3}P_t}\lambda_{UE\text{-}3}^2 + \sqrt{a_{UE\text{-}2}P_t}s_{UE\text{-}2}^2$ to UE-1, UE-2 and UE-3.

Fourth Time-Slot:

Step-14: such as via one or more of processing circuitry 44, relay unit 22, radio interface 42, etc., use SIC, UE-1 and UE-2 decode their own message signals (i.e., $s_{UE\text{-}1}^2$, $s_{UE\text{-}2}^2$), and the message signal of UE-3 (i.e., $\lambda_{UE\text{-}3}^2$), which leads to UE-1 and UE-2 acquiring $s_{UE\text{-}3}^1, s_{UE\text{-}3}^2$.

Step-15: Selection of the best relaying-node based on the predefined criterion as described in Step 6.

Step-16: At the relaying-node (e.g., UE-1 or UE-2), rotate the original symbols aimed to UE-3 by a certain or predefined angle such as via one or more of processing circuitry 44, relay unit 22, radio interface 42, etc.

Step-17: such as via one or more of processing circuitry 44, relay unit 22, radio interface 42, etc. interleave in-phase and quadrature components of the symbols of UE-3 which are not transmitted in the first time-slot to obtain $\lambda_{UE\text{-}3}^1$.

Step-18: Transmit such as via radio interface 42 the message signal, i.e., $\sqrt{P_t}\lambda_{UE\text{-}3}^1$, of UE-3 from this relaying-node (e.g., UE-1 or UE-2).

Step-19: such as via one or more of processing circuitry 44, message unit 24, radio interface 42, etc. UE-3 reorders the received components of $s_{UE-2}^1$ and $s_{UE-2}^2$ in the four time-slots, and applies the ML detection to detect the original message.

In one or more embodiments, the predefined angle that is used for rotation may be the same among the various steps described above. In one example, the predefined angle rotation may be 26.5 degrees and/or may be determined based on SINR. In one or more embodiments, the UE(s) (e.g., UE-1 and/or UE-2) may be informed of the predefined angle by the network node 16 or may look up the predefined angle from a look up table stored in memory 48.

In one or more embodiments, the relaying node during the second time slot may be different from the relaying node in the fourth time slot, such as if channel conditions change. Further, in one or more embodiments, the four time slot configuration of FIGS. 11-12 may be equally applicable to N UEs where N is an integer greater than 3. In this N>3 example, the one or more other UEs may perform similar to functions to UE-1 and/or UE-2 described above.

In one or more embodiments, other UEs such as UE-1 and UE-2, in the example of FIGS. 11-12, may each relay signal $\sqrt{P_t}\lambda f_{UE-3}^2$ during the second time slot and/or signal $\sqrt{P_t}\lambda_{UE-3}^1$ during the fourth time slot such that UE-3 may select the relay signal associated with the highest link quality or highest link performance.

Figure 13:
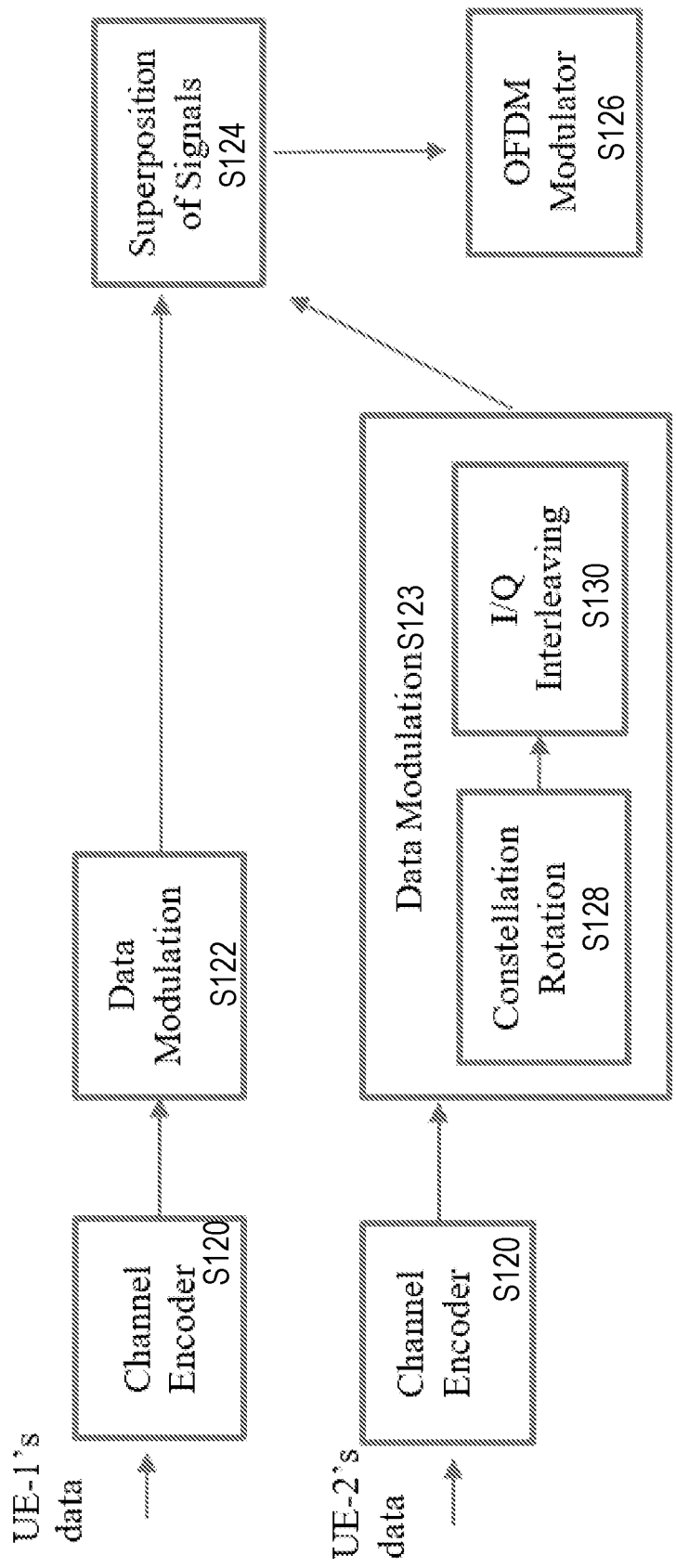
FIG. 13 is diagram of some network node functionality according to some embodiments of the present disclosure.

FIG. 13 is a block diagram of functionality provided by network node 16 such as by radio interface 30 and/or processing circuitry 32. While the example of FIG. 13 assumes transmission to two UEs with the destination UE being UE-2 and the relaying UE being UE-1, other embodiments of FIG. 13 are possible in accordance with the teachings of the disclosure. Channel encoding (Block S120), data modulation (Block S122), superposition of signals (Block S124) and OFDM modulation (Block S126) are functions that are known in the art, but the teachings described herein advantageously modify the data modulation (Block S123) to include constellation rotation (Block S128) and I/Q interleaving (Block S130) as described herein. In FIG. 13, the data associated with UE-2 is being transformed by constellation rotation and I/Q interleaving.

Figure 14:
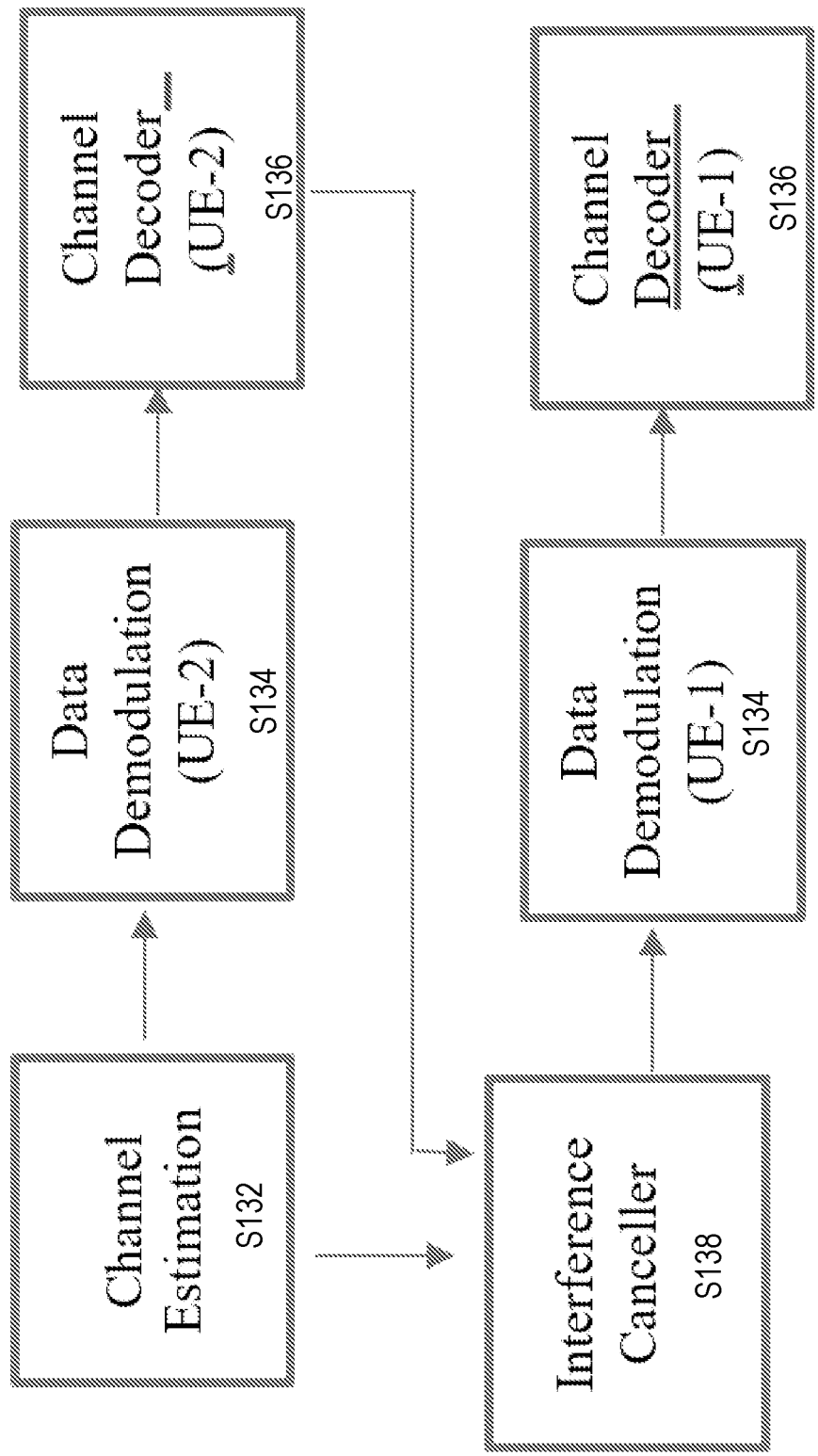
FIG. 14 is a diagram of some UE functionality according to some embodiments of the present disclosure.

FIG. 14 is a block diagram of some UE functionality according to some embodiments of the disclosure. In particular, the channel estimation (Block S132) of the received superposed signal is performed where data is demodulated (Block S134) and the channel is decoded (Block S136), as is generally known in the art. Interference cancellation may be performed (Block S138) and the data demodulation and channel decoding blocks may be performed using the output of interference cancellation S138. Blocks S132-S138 are known in the art.

Therefore, in one or more embodiments described herein, a transmission scheme combining SSD and cooperative NOMA, and, in some embodiments, best-relaying-node selection, is provided. In one or more embodiments, signaling the optimal rotation angle for SSD to the UEs with stronger channel conditions using semi-static signaling, e.g., RRC signaling, or more dynamically using downlink control information (DCI) is provided. In one or more embodiments, signaling the best-relaying-node index to indicate which UE may forward the decoded message of the UE with weaker channel conditions in the second and/or fourth time-slots is provided.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A first user equipment, UE, (UE-1) configured to communicate with a second UE (UE-2) for performing non-orthogonal multiple access, NOMA, communication, the first UE (UE-1) comprising processing circuitry configured to:
   receive a first signal including a first component of interleaved-rotated symbols associated with the second UE (UE-2);
   determine a second component of the interleaved-rotated symbols based at least in part on the received first component; and
   cause transmission of a second signal including the second component of the interleaved-rotated symbols to the second UE (UE-2) as part of the NOMA communication, the second signal not including the first component of the interleaved-rotated symbols.

2. A first user equipment, UE, (UE-2) configured to communicate with a second UE (UE-1) and a network node for performing non-orthogonal multiple access, NOMA, communication, the first UE comprising processing circuitry configured to:
   receive a first signal as part of the NOMA communication, the first signal including a first component of interleaved-rotated symbols associated with the first UE (UE-2);
   receive a second signal as part of the NOMA communication, the second signal including a second component of interleaved-rotated symbols associated with the first UE (UE-2), the second signal not including the first component of interleaved-rotated symbols; and
   determine original symbols based at least in part on the first and second signals.

3. A method implemented by a first user equipment, UE, (UE-1) configured to communicate with a second UE (UE-2) for performing non-orthogonal multiple access, NOMA, communication, the method comprising:
   receiving a first signal including a first component of interleaved-rotated symbols associated with the second UE (UE-2);
   determining a second component of the interleaved-rotated symbols based at least in part on the received first component; and
   causing transmission of a second signal including the second component of the interleaved-rotated symbols to the second UE (UE-2) as part of the NOMA communication, the second signal not including the first component of the interleaved-rotated symbols.

4. The method of claim 3, wherein determining the second component of the interleaved-rotated symbols includes:
   decoding the first component of the interleaved-rotated symbols into deinterleaved-rotated first and second symbols; and
   interleaving the deinterleaved-rotated components of the rotated symbols to generate the second component of the interleaved-rotated symbols that was not included in the first signal.

5. The method of claim 3, wherein determining the second component of the interleaved-rotated symbols includes:
   decoding the first component of the interleaved-rotated symbols to generate deinterleaved and unrotated first and second original symbols;
   rotating the first and second original symbols to generate rotated first and second symbols; and
   interleaving the rotated components of the rotated symbols to generate the second component of the interleaved-rotated symbols that was not included in the first signal.

6. The method of claim 3, wherein the first signal is a superimposed signal including the first component of interleaved-rotated symbols associated with the second UE (UE-2) and another component of interleaved-rotated symbols associated with the first UE (UE-1); and
   the second signal not including components of interleaved-rotated symbols associated with the first UE (UE-1).

7. The method of claim 3, wherein the first signal is received in a first time slot and the second signal is transmitted in a second time slot, the second time slot occurring after the first time slot.

8. The method of claim 7, further comprising:
   receiving, in a third time slot, a third signal including the second component of interleaved-rotated symbols associated with the second UE (UE-2);
   determining the first component of the interleaved-rotated symbols based at least in part on the received first component of the interleaved-rotated symbols; and
   causing transmission, in a fourth time slot occurring after the third time slot, of a fourth signal including the first component of the interleaved-rotated symbols to the second UE (UE-2) as part of the NOMA communication, the fourth signal not including the second component of the interleaved-rotated symbols.

9. The method of claim 3, wherein the first component of interleaved-rotated symbols corresponds to interleaved in-phase and quadrature components of rotated symbols.

10. The method of claim 3, wherein the first UE (UE-1) is a relay UE communicating with the second UE (UE-2) over a wireless communication channel having a higher signal to noise ratio, SNR, than other wireless communication channels between the second UE (UE-2) and other UEs (UE-2).

11. The method of claim 3, wherein the first and second components of the interleaved-rotated symbols are part of an expanded constellation of symbols that is expanded from a rotated constellation of rotated symbols.

12. The method of claim 11, wherein the rotated constellation of symbols corresponds to a rotation of an original constellation of original symbols by a predefined quantity.

13. The method of claim 12, wherein the predefined quantity of rotation is based at least in part on a signal-to-interference-plus-noise ratio, SINR.

14. A method implemented by a first user equipment, UE, (UE-2) configured to communicate with a second UE and a network node for performing non-orthogonal multiple access, NOMA, communication, the method comprising:
receiving a first signal as part of the NOMA communication, the first signal including a first component of interleaved-rotated symbols associated with the first UE (UE-2);
receiving a second signal as part of the NOMA communication, the second signal including a second component of interleaved-rotated symbols associated with the first UE (UE-2), the second signal not including the first component of interleaved-rotated symbols; and
determining original symbols based at least in part on the first and second signals.

15. The method of claim 14, wherein the first signal is a superimposed signal including the first component of interleaved-rotated symbols associated with the first UE (UE-2) and another component of interleaved-rotated symbols associated with the second UE (UE-1).

16. The method of claim 14, wherein the first signal is received in a first time slot and the second signal is transmitted in a second time slot that occurs after the first time slot.

17. The method of claim 16, further comprising:
receiving a third signal during a third time slot as part of the NOMA communication, the third signal including the second component of interleaved-rotated symbols associated with the first UE (UE-2);
receiving a fourth signal during a fourth time slot as part of the NOMA communication, the fourth signal including the first component of interleaved-rotated symbols associated with the first UE (UE-2), the fourth signal not including the second component of interleaved-rotated symbols; and
the determining of the original symbols being further based at least in part on the third and fourth signals.

18. The method of claim 14, wherein the first component of interleaved-rotated symbols correspond to interleaved in-phase and quadrature components of rotated symbols.

19. The method of claim 14, wherein the second UE (UE-1) is a relay UE communicating with the first UE (UE-2) over a channel having a higher signal to noise ratio, SNR, than other channels between the first UE (UE-2) and other UEs (UE-3).

20. The method of claim 14, wherein the first and second components of the interleaved-rotated symbols are part of an expanded constellation of symbols that is expanded from a rotated constellation of rotated symbols.

21. The method of claim 18, wherein the rotated constellation of symbols corresponds to a rotation of an original constellation of original symbols by a predefined quantity.

22. The method of claim 21, wherein the predefined quantity of rotation is based at least in part on a signal-to-interference-plus-noise ratio, SINR.

23. The method of claim 14, further comprising:
receiving at least one other signal including the second component of interleaved-rotated symbols associated with the first UE (UE-2) from at least one other UE (UE-3);
determining the second signal including the second component of interleaved-rotated symbols associated with the first UE (UE-2) has a higher signal to noise ratio, SNR, than the at least one other signal; and
the determining of the original symbols not being based at least in part on the at least one other signal including the second component.

24. The method of claim 14, wherein the first signal is received from the network node (16) and the second signal is received from the second UE (UE-1) acting as a relay UE.

* * * * *